United States Patent
Malloy (12)

(10) Patent No.: US 12,154,166 B2
(45) Date of Patent: Nov. 26, 2024

(54) DYNAMIC PRODUCT PRESENTATION BASED ON DELIVERY METHOD ELIGIBILITY

(71) Applicant: SHOPIFY INC., Ottawa (CA)

(72) Inventor: Allison Malloy, Ottawa (CA)

(73) Assignee: Shopify Inc., Ottawa (CA)

( * ) Notice: Subject to any disclaimer, the term of this patent is extended or adjusted under 35 U.S.C. 154(b) by 0 days.

(21) Appl. No.: 17/336,089

(22) Filed: Jun. 1, 2021

(65) Prior Publication Data

US 2022/0383238 A1 Dec. 1, 2022

(51) Int. Cl.
*G06Q 30/00* (2023.01)
*G06Q 10/083* (2023.01)
*G06Q 30/0601* (2023.01)

(52) U.S. Cl.
CPC ....... *G06Q 30/0641* (2013.01); *G06Q 10/083* (2013.01)

(58) Field of Classification Search
CPC .......................... G06Q 10/083; G06Q 30/0641
See application file for complete search history.

(56) References Cited

U.S. PATENT DOCUMENTS

| | | | |
|---|---|---|---|
| 8,175,935 B2 * | 5/2012 | Dearlove | G06Q 10/08 705/27.1 |
| 8,560,461 B1 * | 10/2013 | Tian | G06Q 10/087 705/332 |
| 9,898,772 B1 * | 2/2018 | Word | G06Q 30/0631 |
| 10,373,118 B1 * | 8/2019 | Lefkow | G06Q 10/0875 |
| 10,489,841 B1 * | 11/2019 | Ogborn | G06Q 30/0629 |
| 10,789,566 B1 * | 9/2020 | Masterman | G06Q 10/083 |
| 11,151,608 B1 * | 10/2021 | Guo | G06Q 30/0277 |
| 11,361,373 B1 * | 6/2022 | Warren | G06F 16/9535 |
| 11,816,624 B2 * | 11/2023 | Goldberg | B64D 9/00 |
| 2006/0095354 A1 * | 5/2006 | Hamzy | G06Q 10/08 705/35 |
| 2009/0234722 A1 * | 9/2009 | Evevsky | G06Q 30/02 705/14.1 |

(Continued)

OTHER PUBLICATIONS

"A Comparative Analysis of the Environmental Benefits of Drone-Based Delivery Services in Urban and Rural Areas," by Jiyoon Park, Solhee Kim, and Kyo Suh, Sustainability 2018, 10, 888, Mar. 20, 2018 (Year: 2018).*

(Continued)

*Primary Examiner* — Anne M Georgalas
(74) *Attorney, Agent, or Firm* — Foley & Lardner LLP

(57) ABSTRACT

A method comprises receiving, by a processor, an indication of a selection of a first item from a set of items displayed on a graphical user interface, the set of items corresponding to at least some products of a plurality of products; identifying, by the processor, a delivery method, wherein the first item is deliverable using the delivery method; determining, by the processor, at least one further product of the plurality of products that satisfies at least one delivery criteria for the delivery method; and causing, by the processor, a dynamic revision to the graphical user interface that displays one or more further items corresponding to the at least one further product, wherein the one or more further items are visually distinct from at least one item of the set of items.

20 Claims, 13 Drawing Sheets

(56) References Cited

U.S. PATENT DOCUMENTS

| | | | |
|---|---|---|---|
| 2014/0279659 A1* | 9/2014 | Seay | G06Q 10/083 |
| | | | 705/337 |
| 2015/0254758 A1* | 9/2015 | Wadhawan | G06Q 30/0603 |
| | | | 705/26.7 |
| 2015/0294262 A1* | 10/2015 | Nelson | G06Q 10/083 |
| | | | 705/330 |
| 2017/0083864 A1* | 3/2017 | Saito | G06Q 30/0635 |
| 2018/0004779 A1* | 1/2018 | Moore | B65B 59/003 |
| 2018/0058864 A1* | 3/2018 | Lection | G01C 21/3415 |
| 2018/0137592 A1* | 5/2018 | Farber | G06Q 10/08 |
| 2018/0174212 A1* | 6/2018 | Lauka | G06Q 30/0609 |
| 2018/0196422 A1* | 7/2018 | Chow | B64C 39/024 |
| 2018/0336623 A1* | 11/2018 | Laye | G06Q 30/0635 |
| 2020/0034910 A1* | 1/2020 | Halbrook | G06Q 30/0631 |
| 2020/0151659 A1* | 5/2020 | Mangalassery Gregory | |
| | | | G06F 16/29 |
| 2020/0160428 A1* | 5/2020 | Calvo | G06Q 30/0633 |

OTHER PUBLICATIONS

"From Ben and Jerry's ice cream to pizzas for priests: How drone startup Manna adapted to the coronavirus pandemic," by Isobel Asher Hamilton, Business Insider, US edition [New York], May 31, 2020 (Year: 2020).*

European Search Report on EP Appl. Ser. No. 22156394.3 dated Jul. 28, 2022 (8 pages).

Examination Report Office Action on Canada Application No. 3,154,517 dated Oct. 1, 2024 (8 Pages).

* cited by examiner

FIG. 2

DYNAMIC PRODUCT PRESENTATION BASED ON DELIVERY METHOD ELIGIBILITY

TECHNICAL FIELD

This application relates generally to graphical user interfaces, and, more particularly, to dynamic revision of graphical user interfaces.

BACKGROUND

Due to rapid advancement of aerial and autonomous navigation, drone delivery has become more ubiquitous and desired. However, these delivery methods are strictly limited by weight and volume, as well as other criteria and constraints. Conventional platforms offering delivery provide a negative user experience because they typically shift the burden of analyzing delivery criteria and identifying eligible items to the customers, who are provided with little to no information on a user interface to determine eligibility. As the customers interact with a website or other graphical user interfaces, the customers may be unclear as to what additional items may be added to the cart without compromising the requested delivery method (e.g., without affecting delivery tiers, costs, and methods). For example, a customer purchasing dinner from a nearby restaurant via drone delivery (for a quick and unique delivery experience) may have already placed two main courses (entrees) in an electronic cart for purchase. However, the customer may not know how adding a dessert or drink will affect eligibility of the meal delivered by drone. When adding an item, such as a dessert or drink, the customers may be surprised and frustrated by delivery method changes that appear during a checkout process. These conventional approaches do not present an interface that allows customers to determine an impact of an additional item on the delivery method. As a result, customers attempt a trial and error process to identify the item that affected the delivery method, which is time-consuming and frustrating, leading many customers to abandon the cart altogether. Once a cart is finalized, a merchant may not realize until after checkout that the purchase content is not compliant with a selected delivery method, such as a package that is too heavy for a desired drone delivery.

BRIEF DESCRIPTION OF THE DRAWINGS

The accompanying drawings constitute a part of this specification and illustrate embodiments of the subject matter disclosed herein.

FIG. 2 shows a home page of an administrator, according to an embodiment.

DETAILED DESCRIPTION

Figure 1:
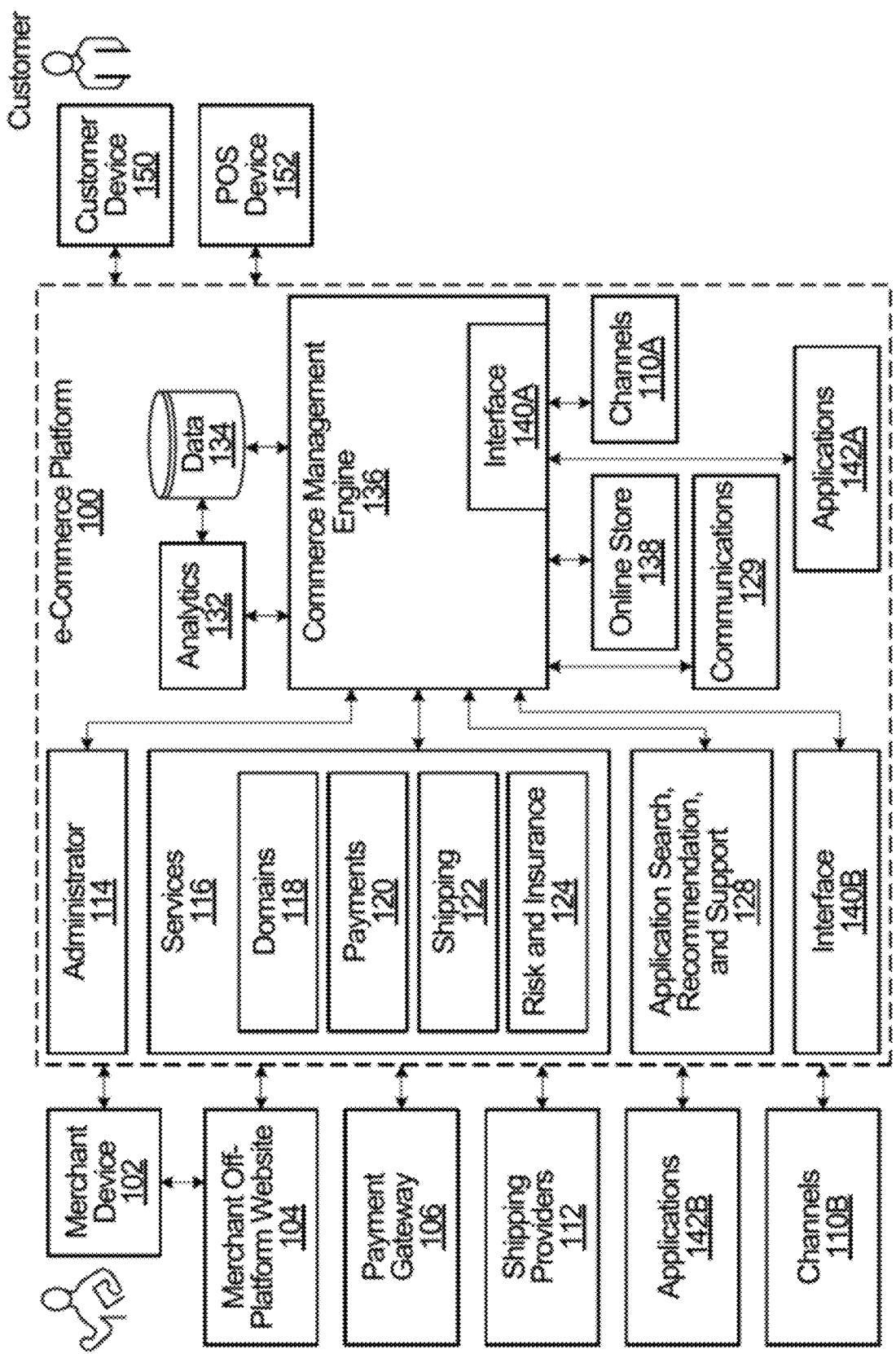
FIG. 1 shows an e-commerce platform, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

To address the above-described drawbacks, a presentation system can dynamically revise and reconfigure graphical user interfaces (GUIs) presented by merchants and implement algorithms that determine how selected items and other items in inventory may affect the delivery method. The presentation system may display various options to customers, such that customers are no longer required to monitor selected items to determine whether they qualify for the customers' desired delivery method. The presentation may assist in the generation of a delivery package that is known to comply or more likely to comply with the constraints of particular delivery channels, such as a drone. The system may implement the following illustrative method.

I. Example E-Commerce Platform

In some embodiments, the methods disclosed herein may be performed on or in association with a commerce platform, such as an e-commerce platform. Therefore, an example of a commerce platform will be described.

FIG. 1 illustrates an e-commerce platform 100, according to an illustrative system embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the e-commerce platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), and the like. However, even these 'other' merchant commerce facilities may be incorporated into the e-commerce platform 100, such as where POS devices 152 in a physical store of a merchant are linked into the e-commerce platform 100, where a merchant off-platform website 104 is tied into the e-commerce platform 100, such as through 'buy buttons' that link content from the merchant off-platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms of online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In some embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant device 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In some embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The web browser (or other application) of the customer device 150 then renders the page accordingly.

In some embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g., as data facility 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Even though the shipping services 122 is shown as a part of the e-commerce platform 100, the shipping services 122 may be implemented by a third party, such as a third party delivery or shipping service. The shipping service 122 may have a server/computer in communication with the e-commerce platform 100 where the shipping service 122 may communicate shipping requirements (e.g., shipping weight, categories, restrictions, and preferences). The e-commerce platform 100 may then use these requirements to dynamically update one or more graphical user interfaces discussed herein. The shipping service 122 may then receive delivery instructions from the e-commerce platform 100 and may perform the delivery using a delivery apparatus discussed herein (e.g., delivery apparatus 304 depicted in FIG. 3, such as a drone, bike, or vehicle). The shipping service 122 may also be in communication with a delivery provider's servers and/or a delivery apparatus processor, such delivery data (e.g., status of different deliveries) can be communicated to the e-commerce platform 100.

Therefore, shipping service 122 may or may not be a part of the e-commerce platform 100. For instance, the shipping service 122 may be associated with a separate entity that transmits its requirements and receives delivery instructions from the e-commerce platform 100. In another embodiment, the methods and systems discussed herein may be provided as a standalone service where the shipping service 122 utilizes the e-commerce platform 100 to dynamically customize graphical user interfaces and transmit delivery instructions and attributes back to the shipping service 122.

In a non-limiting example, the shipping service 122 represents a server of a delivery platform that utilizes a drone to deliver food. The shipping service 122 first transmits drone delivery requirements to the e-commerce platform 100, such that various graphical user interfaces are revised accordingly. When the customer's order is finalized, the e-commerce platform 100 transmit delivery data (e.g., items and address) to the shipping service 122.

Figure 2:
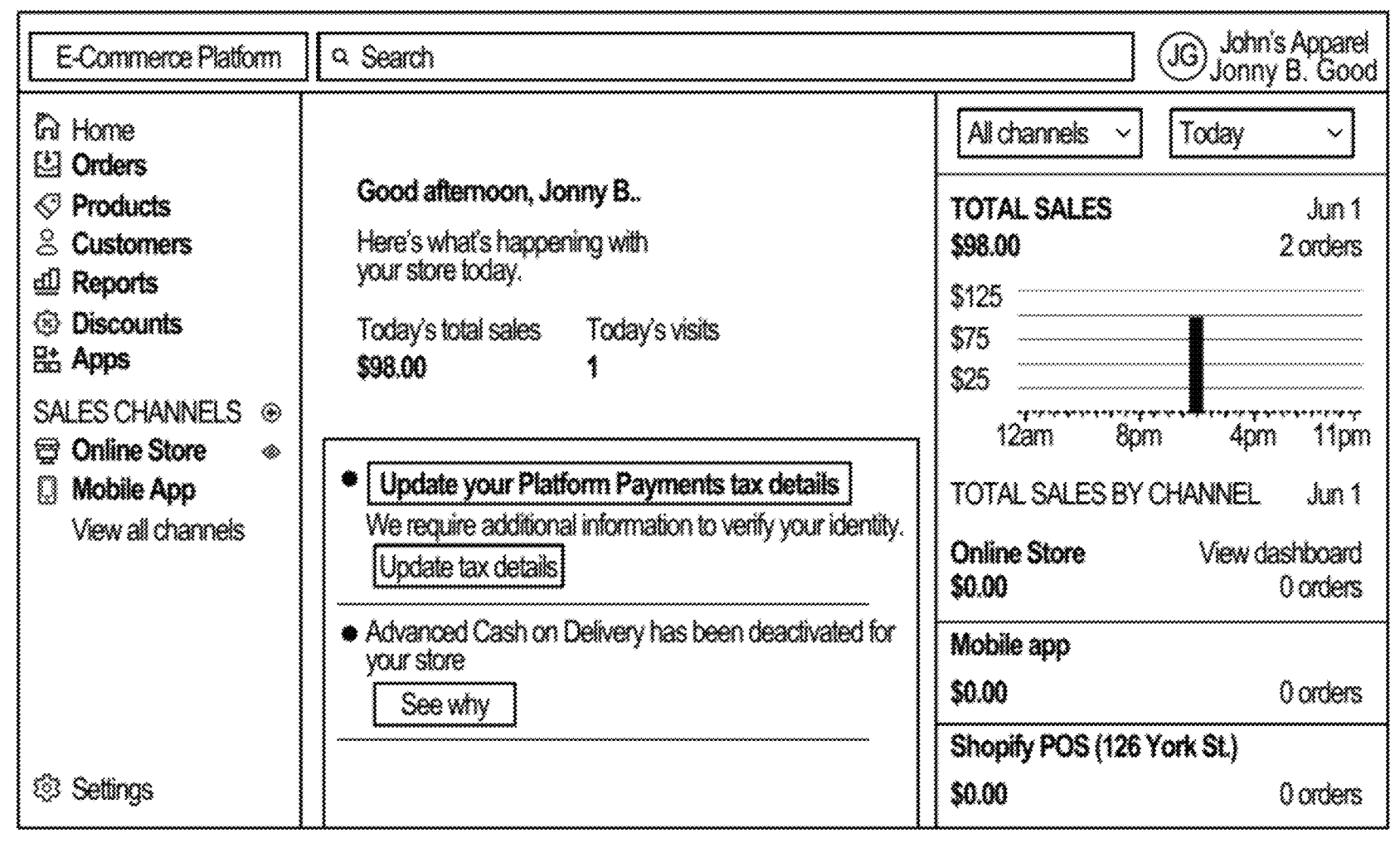

FIG. 2 depicts a non-limiting embodiment for a home page of a merchant administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store 138, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the merchant device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g., via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's bank account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in some embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In some embodiments, an application 142A may be provided by the same party providing the e-commerce platform 100 or by a different party. In some embodiments, an application 142B may be provided by the same party providing the e-commerce platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the e-commerce platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the e-commerce platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, backpressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension or API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time.

In some embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commerce management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that does not provide an API connection). An API fulfillment service may trigger a third-party, where the third-party application creates a fulfillment record. A legacy fulfillment service may trigger a custom API call from the commerce management engine 136 to a third-party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

II. Example Networked Components of System

Figure 3:
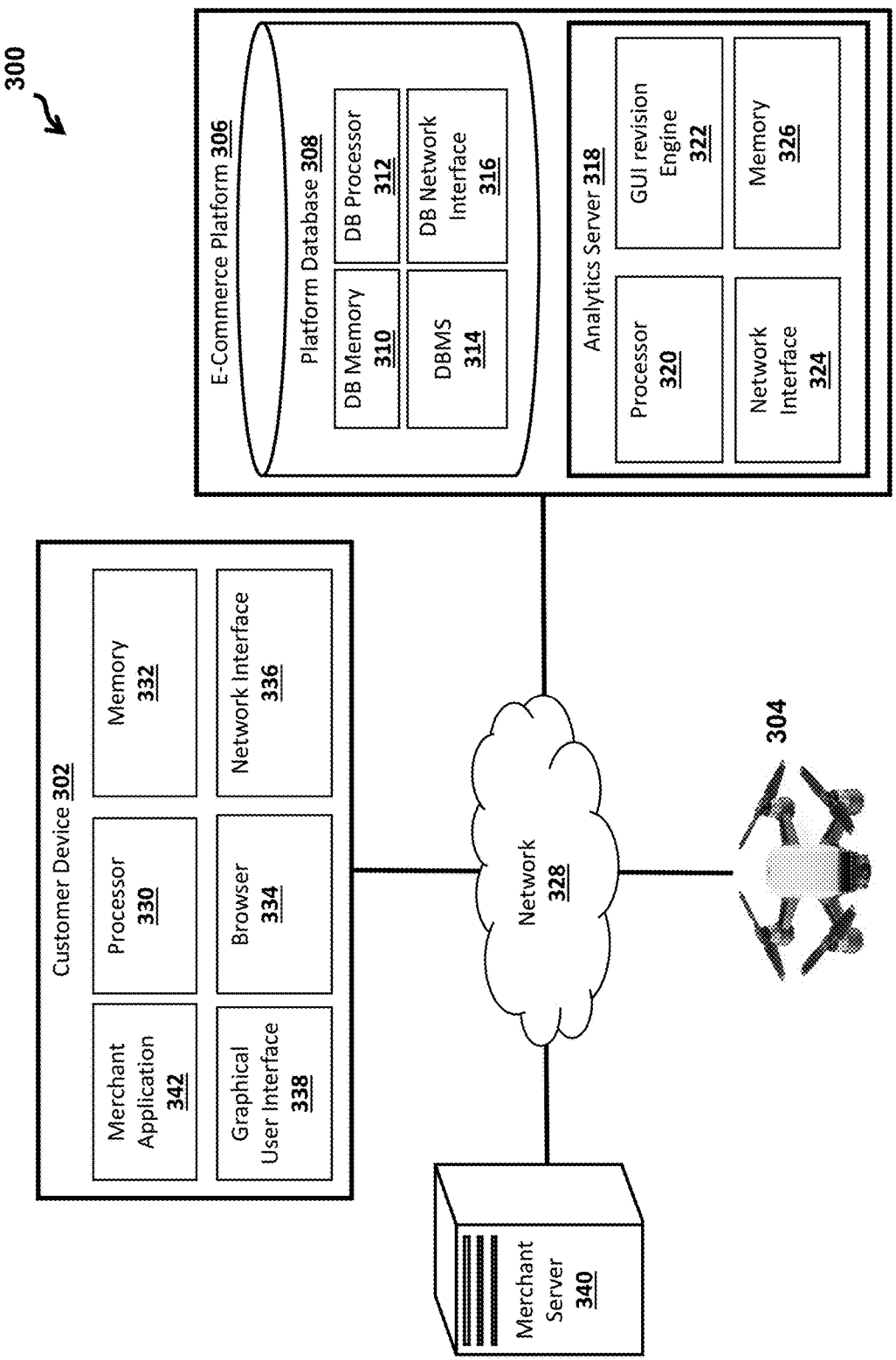
FIG. 3 shows components of a dynamic product presentation system, according to an embodiment.

FIG. 3 illustrates components of a dynamic product presentation system 300, according to an embodiment. The system 300 includes a customer device 302, a delivery apparatus 304, and a merchant server 340 to connect with an e-commerce platform 306 via a network 328. The depicted system 300 is described and shown in FIG. 3 as having one of each component for ease of description and understanding of an example. The embodiments may include any number of the components described herein. The embodiments may comprise additional or alternative components, or may omit certain components, and still fall within the scope of this disclosure.

The network 328 may include any number of networks, which may be public and/or private networks. The network 328 may comprise hardware and software components implementing various network and/or telecommunications protocols facilitating communications between various devices, which may include devices of the system 300 or any number of additional or alternative devices not shown in FIG. 3. The network 328 may be implemented as a cellular network, a Wi-Fi network, or other wired local area network (LAN) or wireless LAN, a WiMAX network, or other wireless or wired wide area network (WAN), and the like. The network 328 may also communicate with external servers of other external services coupled to the network 328 such as servers hosting a social media platform, a banking platform, or the merchant server 340.

The network 328 may include any number of security devices or logical arrangements (e.g., firewalls, proxy servers, DMZs) to monitor or otherwise manage web traffic to the e-commerce platform 306. Security devices may be configured to analyze, accept, or reject incoming web requests from the customer device 302, the merchant server 340, and/or the customer device 302. In some embodiments, the security device may be a physical device (e.g., a firewall). Additionally or alternatively, the security device may be a software application (e.g., Web Application Firewall (WAF)) that is hosted on, or otherwise integrated into, another computing device of the system 300. The security devices monitoring web traffic are associated with and administered by the e-commerce platform 306.

The customer device 302 may be any electronic device comprising hardware and software components capable of performing the various tasks and processes described herein. Non-limiting examples of the customer device 302 may include mobile phones, tablets, laptops, and personal computers, among others. When communicating with components of the e-commerce platform 306, the customer device 302 may generate web traffic (or web session data) that is processed by or otherwise accessible to the analytics server 318 of the e-commerce platform 306. The web traffic may comprise data packets that include various types of data that can be parsed, analyzed, or otherwise reviewed by various programmatic algorithms of the analytics server 318. For instance, the web traffic data may indicate which website was accessed by a customer operating the customer device 302 (e.g., whether a customer operating the customer device 302 has accessed a checkout page or added any products to an electronic cart).

In an example, a customer operating the customer device 302 visits a website of a merchant (e.g., an online store of the merchant or a merchant's online store) hosted by the merchant server 340 using the browser 334. The merchant's online store may include one or more features hosted (or otherwise produced or functionally controlled) by the analytics server 318. For instance, the analytics server 318 of the e-commerce platform 306 may provide (e.g., host) at least a portion of a webpage for the merchant's online store to the customer device 302 (e.g., checkout page). In another example, the analytics server 318 may revise one or more features displayed on the merchant's online store. The browser 334 may transmit and receive data packets in order to display various features of the merchant's online store on a GUI 338.

The merchant's online store may refer to any electronic platform that is directly or indirectly hosted by a merchant associated with the merchant server 340. For instance, the merchant's online store may be a website displayed on a browser or a mobile application that is hosted (or otherwise functionally controlled) by the merchant server 340 and/or the analytics server 318. In the embodiments where the merchant's online store is website, a customer operating the customer device 302 may execute the browser 334 (or other applications) to connect the customer device 302 to the analytics server 318 and/or the merchant server 340 using an IP Address obtained by translating a domain name of the website. The analytics server 318 and/or the merchant server 340 may execute code associated with the website and render the appropriate graphics to be presented to the GUI 338. In embodiments where the merchant's online store is a mobile application, the customer device 302 may execute a merchant application 342 that is installed on the customer device 302. The customer device 302 and/or the merchant application 342 may then execute the appropriate code to display features of the merchant's online store onto the GUI 338.

Even though certain embodiments described herein describe the website as being hosted by the merchant server 340, the methods and systems described herein also apply to websites associated with the merchant server 340 that are hosted by a third-party webserver. Furthermore, the methods described herein are also applicable in other environments such as non-ecommerce infrastructures and system architectures. The webpage presented on the GUI 338 may include an electronic cart where the customer can use the browser 334 to add products and complete the transaction by inputting sensitive information such as payment information.

The customer device 302 may be a mobile phone, tablet, gaming console, screen-less device, virtual personal assistant device (e.g., screen-less devices), laptop, or computer owned and/or used by a customer. The customer device 302 may include a processor 330, memory 332, GUI 338, and network interface 336. An example of the GUI 338 is a display screen (which may be a touch screen), a gesture recognition system, a keyboard, a stylus, and/or a mouse. The network interface 336 is provided for communicating over the network 328. The structure of the network interface 336 will depend on how the customer device 302 interfaces with the network 328. For example, if the customer device 302 is a mobile phone or tablet, the network interface 336 may include a transmitter/receiver with an antenna to send and receive wireless transmissions to/from the network 328. The customer device 302 may be connected to the network 328 with a network cable. The network interface 336 may include, for example, a network interface card (NIC), a computer port, and/or a network socket. The processor 330 directly performs or instructs all of the operations performed by the customer device 302. Non-limiting examples of these operations include processing customer inputs received from the GUI 338, preparing information for transmission over the network 328, processing data received over the network 328, and instructing a display screen to display information. The processor 330 may be implemented by one or more processors that execute instructions stored in the memory 332. Alternatively, some or all of the processor 330 may be implemented using dedicated circuitry, such as an ASIC, a GPU, or a programmed FPGA.

The e-commerce platform 306 is a computing system infrastructure that may be owned and/or managed (e.g., hosted) by an e-commerce service and, in some embodiments, may be the same as or similar to that described with reference to FIGS. 1-2, though this need not be the case. The e-commerce platform 306 includes electronic hardware and software components capable of performing various processes, tasks, and functions of the e-commerce platform 306. For instance, the computing infrastructure of the e-commerce platform 306 may comprise one or more platform networks (not shown) interconnecting the components of the e-commerce platform 306. The platform networks may comprise one or more public and/or private networks and include any number of hardware and/or software components capable of hosting and managing the networked communication among devices of the e-commerce platform 306.

As depicted in FIG. 3, the components of the e-commerce platform 306 include the analytics server 318 and a platform database 308. However, the embodiments may include additional or alternative components capable of performing the operations described herein. In some implementations, certain components of the e-commerce platform 306 may be embodied in separate computing devices that are interconnected via one or more public and/or private internal networks (e.g., network 328). In some implementations, certain components of the e-commerce platform 306 may be integrated into a single device. For instance, the analytics server 318 may host the platform database 308.

Furthermore, the e-commerce platform 306 may include the analytics server 318 configured to serve various functions of the e-commerce platform 306. Non-limiting examples of such functions may include webservers hosting webpages (or at least a portion of a webpage, such as the checkout portion) on behalf of merchants (e.g., merchants' online stores), security servers executing various types of software for monitoring web traffic (e.g., determining that a customer has reached a checkout page using the electronic device), and database servers hosting various platform databases 308 of the e-commerce platform 306, among others.

The illustrative e-commerce platform 306 is shown and described as having only one analytics server 318 performing each of the various functions of the e-commerce service. For instance, the analytics server 318 is described as serving the functions of executing a GUI revision engine 322 and a webserver (hosting webpages for merchants' online stores and account administration. It is intended that FIG. 3 is merely illustrative and that embodiments are not limited to the description of the system 300 or the particular configuration shown in FIG. 3. The software and hardware of the analytics server 318 may be integrated into a single distinct physical device (e.g., a single analytics server 318) or may be distributed across multiple devices (e.g., multiple analytics servers 318).

For example, some operations may be executed on a first computing device while other operations may be executed on a second computing device, such that the functions of the analytics server 318 are distributed among the various computing devices. In some implementations, the analytics server 318 may be a virtual machine (VM) that is virtualized and hosted on computing hardware configured to host any number of VMs.

The platform database 308 stores and manages data records concerning various aspects of the e-commerce platform 306, including information about, for example, actors (e.g., merchants, customers, or platform administrators), electronic devices, merchant offerings (e.g., products, inventory, or services), delivery methods, various metrics and statistics, machine-learning models, merchant pages hosting merchant stores, and other types of information related to the e-commerce platform 306 (e.g., usage and/or services).

The platform database 308 may also include various libraries and data tables including detailed data needed to perform the methods described herein, such as revising the merchant's online store. For instance, the analytics server 318 may generate a data table associated with different products offered by different merchants and/or merchants' online stores. In another example, the analytics server 318 may generate a data table associated with different rules and regulations to identify cross-sell and up-sell products.

Various predetermined rules, regulations, and thresholds discussed herein may be set by the analytics server 318 or a system administrator of the e-commerce platform 306. Additionally or alternatively, the customer operating the customer device 302 and/or the merchant server 340 may input or modify the predetermined rules. For instance, the analytics server may keep a separate data table including a list of upsell and/or cross sell products and their corresponding attributes/rules. However, a customer operating the customer device 302 may revise such a list. For instance, the customer may input food allergies or preferences to instruct the analytics server 318 to remove one or more products within the merchant's online store.

The platform database 308 may be hosted on any number of computing devices having a processor (sometimes referred to as a database (DB) processor 320) and non-transitory machine-readable memory configured to operate as a DB memory 310 and capable of performing the various processes and tasks described herein. For example, one or more analytics servers 318 may host some or all aspects of the platform database 308.

A computing device hosting the platform database 308 may include and execute database management system (DBMS) 314 software, though a DBMS 314 is not required in every potential embodiment. The platform database 308 can be a single, integrated database structure or may be distributed into any number of database structures that are configured for some particular types of data needed by the e-commerce platform 306. For example, a first database could store user credentials and be accessed for authentication purposes, and a second database could store raw or compiled machine-readable software code (e.g., HTML, JavaScript) for webpages such that the DB memory 310 is configured to store information for hosting webpages.

The computing device hosting the platform database 308 may further include a DB network interface 324 for communicating via platform networks of the e-commerce platform 306. The structure of the DB network interface 316 will depend on how the hardware of the platform database 308 interfaces with other components of the e-commerce platform 306. For example, the platform database 308 may be connected to the platform network with a network cable. The DB network interface 324 may include, for example, a NIC, a computer port, and/or a network socket. The processor 320 directly performs or instructs all of the operations performed by the platform database 308.

Non-limiting examples of such operations may include processing queries or updates received from the analytics server 318, customer device 302, and/or merchant server 340; preparing information for transmission via the platform network and/or the external networks. The processor 320 may be implemented by one or more processors that execute instructions stored in the DB memory 310 or other non-transitory storage medium. Alternatively, some or all of the DB processor 312 may be implemented using dedicated circuitry such as an ASIC, a GPU, or a programmed FPGA.

The DB memory 310 of the platform database 308 may contain data records related to, for example, customer activity, and various information and metrics derived from web traffic involving customer accounts. The data may be accessible to the analytics server 318. The analytics server 318 may issue queries to the platform database 308 and data updates based upon, for example, successful or unsuccessful authentication sessions.

The analytics server 318 may be any computing device that comprises a processor 320 and non-transitory machine-readable storage media (e.g., server memory 326) and that is capable of executing the software for one or more functions such as the GUI revision engine 322. In some cases, the server memory 326 may store or otherwise contain the computer-executable software instructions, such as instructions needed to execute the GUI revision engine 322. The software and hardware components of the analytics server 318 enable the analytics server 318 to perform various operations that serve particular functions of the e-commerce platform 306.

For example, the analytics server 318 that serves as a webserver may execute various types of webserver software (e.g., Apache® or Microsoft IIS®). As another example, the analytics server 318 may cause the merchant's online store to be revised in accordance with the methods described herein. The analytics server 318 may either directly revise the online store or instruct the merchant server 340 or any other web server to revise the online store accordingly. It is intended that these are merely examples and not intended to be limiting as to the potential arrangements or functions of the analytics server 318. Non-limiting examples of the analytics server 318 may include desktop computers, laptop computers, and tablet devices, among others.

The analytics server 318 may execute the GUI revision engine 322 that directly or indirectly revises the GUI accessed by the customer operating the customer device 302 (merchant's online store). For instance, the GUI revision engine 322 may transmit an instruction that causes the merchant server 340 to revise one or more items displayed within the online store in accordance with the methods described herein. The location of the GUI revision engine 322 is merely an example. The GUI revision engine 322 may be executed by the analytics server 318 and/or by the customer device 302 under the direction of the analytics server 318. Therefore, the GUI revision engine 322 can be performed locally on a customer's device or in the back-end of the system 300.

Additionally or alternatively, the GUI revision engine 322 could be provided by the e-commerce platform 306 as a separate web-based or cloud-based service. In some implementations, the GUI revision engine 322 is implemented at least in part by a user device such as the customer device 302 and/or the merchant server 340. Other implementations of the GUI revision engine 322 are also contemplated such as a stand-alone service to dynamically revise features of any website. While the GUI revision engine 322 is shown as a single component of the e-commerce platform 306, the GUI revision engine 322 could be provided by multiple different components that are in networked communication with the analytics server 318 executing the GUI revision engine 322.

The merchant server 340 may be any server associated with a merchant hosting an online store. The merchant server 340 may be any computing device hosting a website (or any other electronic platform) accessible to customers (e.g., operating the customer device 302) via the network 328. The merchant server 340 may include a processing unit and non-transitory machine-readable storage capable of executing various tasks described herein. The processing unit may include a processor with a computer-readable medium, such as a random access memory coupled to the processor. Non-limiting examples of the processor may include a microprocessor, an application specific integrated circuit, and a field programmable object array, among others. Non-limiting examples of the merchant server 340 may include workstation computers, laptop computers, server computers, laptop computers, and the like. While the system 300 includes a single merchant server 340, in some embodiments the merchant server 340 may include a number of computing devices operating in a distributed computing environment.

The merchant server 340 may be configured to interact with one or more software modules of a same or a different types depicted within the system 300. For instance, the merchant server 340 may execute software applications configured to host an electronic platform which may generate and serve various webpages to the customer device 302. The electronic platform may also embed various GUIs generated by the analytics server 318. The online store hosted by the merchant server 340 may be configured to require user authentication based upon a set of user authorization credentials (e.g., username, password, biometrics, cryptographic certificate, and the like).

The delivery apparatus 304 may be any delivery vehicle whether controlled by an operator or equipped with autonomous navigation protocols. The delivery apparatus 304 is configured to deliver one or more items offered by the merchant's online store (e.g., website associated with the merchant server 340). Although depicted in FIG. 3 as a drone, non-limiting examples of the delivery apparatus 304 may include aerial delivery methods (e.g., drones), automobiles, bicycles, scooters, and the like. The delivery apparatus 304 may also include a processor in communication with the analytics server 318 and/or the merchant server 340. As will be described below, the analytics server 318 may revise the presentation of products within the merchant's online store based on a status of the delivery apparatus 304 received via the delivery apparatus 304 processor.

The analytics server 318 may provide a platform to view and manage data associated with the delivery apparatus 304. For instance, the platform may include a status of the delivery, delivery requirements, ongoing/current deliveries, items being delivered, and any other data associated with past, current, and scheduled deliveries. Using this platform, end users may view delivery data and may revise ongoing or scheduled deliveries. For instance, an end user may use the platform to assign a delivery to a particular delivery apparatus (e.g., a particular drone). In another example, the platform can be used to communicate with the merchant server 340 or the customer device 302. In some configurations, the platform may be provided by a delivery service server (not shown) or the merchant server 340.

III. Example Methods of Dynamically Revising GUIs

Figure 4:
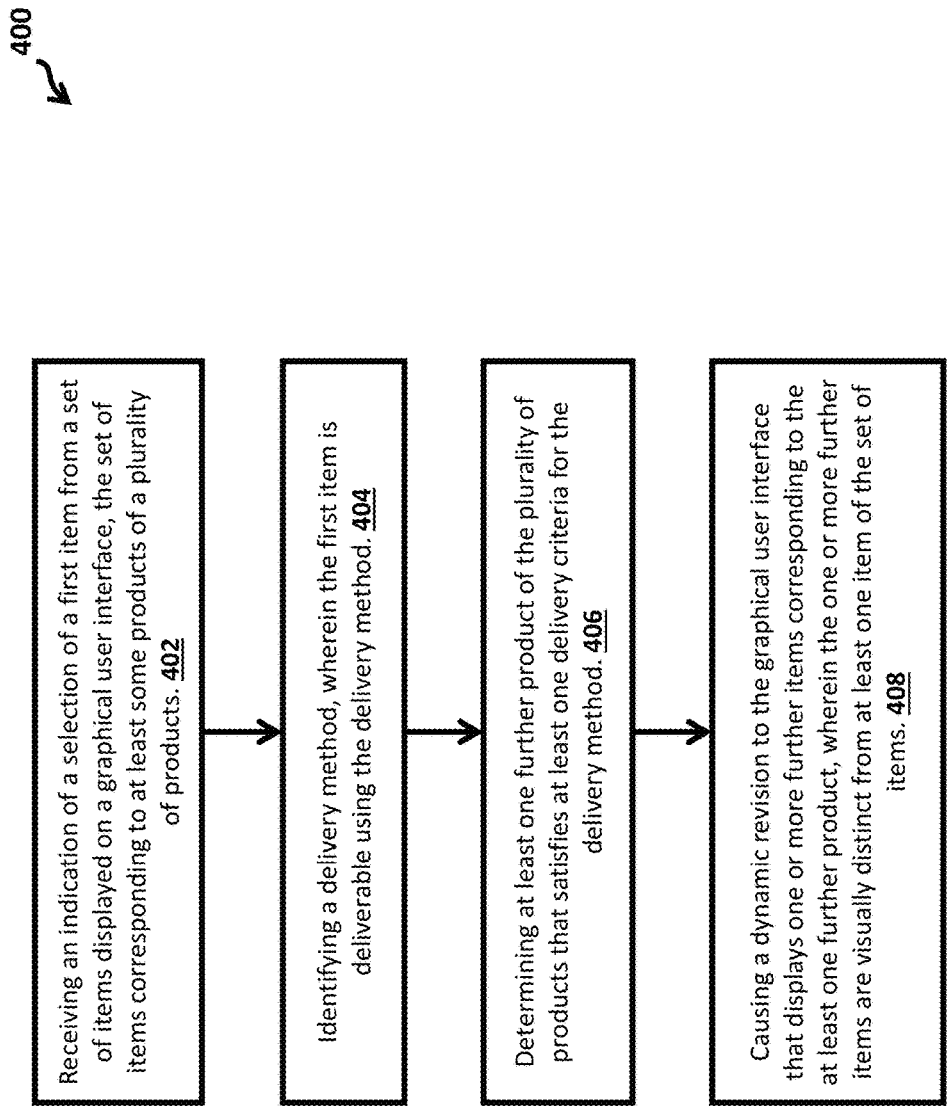
FIG. 4 shows execution steps for a dynamic product presentation system, according to an embodiment.

FIG. 4 illustrates a flowchart depicting operational steps for a dynamic product presentation system, in accordance with an embodiment. The method 400 describes how a server, such as the analytics server described in FIG. 3, can dynamically revise a GUI presenting various items based on a customer's delivery method. The method 400 is described in the context of revising visual attributes of the GUI associated with a merchant's online store that displays various items to be sold and/or delivered by a merchant. Therefore, as described herein, the GUI may refer to a website for the merchant's online store or an application (e.g., mobile application) for the merchant's online store.

Even though the method 400 is described as being executed by the analytics server, the method 400 can be executed by any server and/or locally within a customer's trusted device (e.g., customer device discussed in FIG. 3). Additionally or alternatively a server can execute the method 400 in other computer environments (other than the environments depicted in FIGS. 1-3). For instance, the method 400 can be executed by a server providing SaaS in a non-commerce infrastructure for any electronic platform.

Additionally or alternatively, the method 400 may be executed by a webserver hosting a GUI (e.g., a website associated with the merchant's online store or content for a mobile application) and executing various GUI revision methods described herein. Additionally or alternatively, the method 400 may be executed by a server hosting an application configured to display a GUI associated with the merchant's online store and acting as the analytics server by executing various GUI revision methods described herein. Furthermore, other configurations of the method 400 may comprise additional or alternative steps, or may omit one or more steps altogether.

At step 402, the analytics server may receive an indication of a selection of a first item from a set of items displayed on a GUI, the set of items corresponding to at least some products of a plurality of products. As used herein, an item refers to a representation of a merchant's product on the GUI (e.g., website or application of the merchant's online store). The merchant may offer various products that are displayed within the GUI (e.g., items to be selected by customers).

The analytics server may receive an indication that a customer has selected one or more items for a transaction from a GUI (e.g., merchant's online store visualized on a website or an application). For example, the analytics server may receive, via an electronic message, an indication that a customer has added a first item to an electronic cart of the merchant's website or application. The analytics server may identify the first item selected by the customer. The analytics server may then query a database (e.g., a look-up table) and identify various attributes associated with the first item, such as type (e.g., whether the first item is solid or liquid, alcohol or non-alcoholic, magnetic or non-magnetic, hot or cold), volume, weight, packaging data (e.g., whether the item must be included in a box or a bag), category (e.g., data indicating that the first item is, such as indicating that the first item is food or drinks), and the like.

In an example, the analytics server may receive an electronic message from a webserver associated with the GUI. The analytics server parses and analyzes the electronic message to identify the customer and the item(s) added to the customer's cart. The electronic message may include a user identifier (UID). The UID may be a unique identifier associated with the customer, which may be utilized to recognize the customer interacting with the merchant's online site. For instance, the customer may have provided login credentials (e.g., name, UID, email address, phone number, mailing address, or other personally-identifiable information) while interacting with the merchant's online site. The UID may also refer to a unique identifier of the customer's device, such as an IP address, MAC address, or any other identifier associated with the customer's device. The analytics server uses this information to identify an account of the customer, which may include payment information, recent purchases, credentials, authorized communication channels and devices, saved preferences, and other customer information.

The analytics server may then parse the electronic message to identify attributes of the item added to the customer's cart. For instance, the electronic message may include a unique cart ID and the analytics server may retrieve data corresponding to the cart ID.

At step 404, the analytics server may identify a delivery method, wherein the first item is deliverable using the delivery method. The analytics server may identify a delivery method for the customer, such as drone delivery, automobile delivery, bike delivery, scooter delivery, and the like. The analytics server may analyze the electronic message received from the merchant's webserver to identify an entry point (e.g., clicked on a social network advertisement or a banner on a website) by the customer for the merchant's website. The electronic message may include the customer's digital footprint. The analytics server may analyze the customer's digital footprint to identify a delivery method for the customer. In a non-limiting example, the customer may have accessed the GUI of the merchant's online store as a result of clicking on an advertisement or other electronic content. For instance, the merchant may have advertised its drone delivery and the customer may have clicked on the advertisement where the customer was eventually directed to the merchant's website. The webserver may include the above-described digital footprint (e.g., a digital path indicating how the customer accessed the GUI of the merchant's online store). The analytics server may then analyze the digital footprint and determine that the customer is interested in drone delivery.

Additionally or alternatively, the analytics server may analyze the electronic message received from the merchant's web server to identify a delivery method selected by the customer. For instance, the customer may have indicated, using one or more input elements of the merchant's website, that the customer is interested in drone delivery. Additionally or alternatively, the analytics server may identify the delivery method based on a merchant's configuration (e.g. merchant pre-set default). In those embodiments, the analytics server may query a server associated with the merchant and retrieve a default delivery method. Additionally or alternatively, the analytics server may determine the delivery method based on determining the most cost-effective effective or reliable option available for the items in the cart. The analytics server uses various predetermined rules (associated with the merchant and/or the customer) to determine the delivery method.

Additionally or alternatively, the analytics server may identify the delivery method based on a customer profile. As discussed above, the analytics server may parse and analyze the electronic message received from the merchant's webserver to determine a UID. The analytics server may then retrieve a customer profile associated with the UID. The customer profile may include the customer's preferred method of delivery. For instance, the customer profile may indicate that this particular customer would prefer drone delivery.

The customer profile may also include historical data associated with the customer's previous deliveries. For instance, upon further analysis, the analytics server may determine that the customer has selected drone delivery for a portion of previous deliveries that satisfies a threshold (e.g., the customer selects drone delivery 85% of time or the customer has selected drone delivery for the past 10 consecutive deliveries). Using this information, the analytics server may infer the customer's preferred delivery method.

The customer profile may also include various rules and regulations that can be applied to identify the customer's preferred delivery method. For instance, the customer may have previously identified that the customer prefers drone delivery for items purchased from a particular merchant. In another example, the customer may have previously identified that the customer prefers drone delivery (or bike delivery) when purchasing food but prefers automobile delivery when purchasing other items. In yet another example, the customer may have previously identified that the customer prefers drone delivery for purchases that are more than $50.

The delivery methods may also include various delivery tiers. For instance, the drone delivery method may include two delivery tiers (e.g., prioritized or urgent delivery corresponding to a fast delivery option, and a non-urgent delivery corresponding to a normal delivery option). In another example, delivery tiers may apply to different items purchased by customers (e.g., a customer may desire a pair of sunglasses delivered via drone delivery to arrive within hours, but the same customer may desire another item to be delivered in a week via multi-day shipping (e.g., via carrier trucks)).

The analytics server may also be in communication with the merchant's webserver (or directly with a computer associated with the delivery apparatus), such that the system can update a status of delivery apparatuses in real time. For instance, the system may use an application programming interface (API) to retrieve a status of drones used to deliver items (e.g. poor weather conditions may mean that all drones are grounded for the time being). In another example, the system may utilize estimated flight times for scheduled deliveries of a drone to determine whether there is sufficient time for the drone to return to the merchant, obtain the items purchased by the customer, and deliver those items to the customer before the next scheduled delivery. Based on the status of the drones, the analytics server may determine whether drone delivery is an available option. The analytics server may revise the GUI of the merchant's online store and remove drone delivery if the analytics server determines that drone delivery is no longer an option for the customer.

The analytics server may be in real-time communication with the delivery apparatus and/or merchant's server, such that the analytics server can revise the GUI in real-time. For instance, the analytics server may transmit a notification (e.g., display a window on the GUI, a notification, a pop-up, or a graphical indicator) informing the customer that the preferred delivery method is no longer available. In another example, the analytics server may revise the GUI, such that the GUI no longer prioritizes items that are eligible for a delivery method that is no longer available.

In some configurations, the merchant's online store (e.g., a merchant's server) may be in communication with more than one delivery services. As a result, adding a particular item may affect which delivery service can be used by the merchant to deliver the items. For instance, the merchant may utilize multiple drone delivery services where each drone delivery service may have its own specific requirements. For instance, one drone delivery service may have a different requirement than other drone delivery service (e.g., a first drone delivery service may prohibit delivery of alcoholic beverages but a second drone delivery service may allow delivery of alcoholic beverages). Different drone delivery requirements may also have different availability status, thereby having different estimated delivery times.

In those embodiments, the analytics server may retrieve the criteria for each drone delivery service separately and determine eligible/ineligible of the items accordingly. For instance, when the customer selects an alcoholic beverage, the customer may be eligible for drone delivery. However, the customer is no longer eligible for drone delivery performed by the first drone delivery service that prohibits delivery of alcoholic beverages. This change may also change the customer's estimated delivery time because the second drone delivery service may have a different estimated delivery time and/or may have different drone availability/status. The analytics server may then retrieve a delivery apparatus status based on the revised electronic cart (that includes the alcoholic beverage) and may calculate a revised delivery status. The analytics server may transmit a notification to the customer informing him/her that selecting the alcoholic beverage may change the estimated delivery time. For instance, the analytics server may display a window informing the customer that "selecting the alcoholic beverage may delay your estimated delivery time by 10 minutes."

At step 406, the analytics server may determine at least one further product of the plurality of products that satisfies at least one delivery criteria for the delivery method. The analytics server may determine what products, other than the item(s) that has already been selected by the customer (e.g., first item), can be added to the customer's electronic cart without violating delivery criteria (also referred to herein as the eligible item(s)). The analytics server may analyze all products offered by the merchant or only analyze the items that are being currently displayed (e.g., items displayed when the customer added the first item to the electronic cart).

The analytics server may retrieve a set of delivery criteria associated with the delivery method identified in step 404. Different delivery methods may have their corresponding criteria and constraints. The criteria may refer to a set of limits, lists, and/or rules with which the products singularly or as combined for a delivery must comply. For instance, a delivery method (e.g., drone delivery) may be limited by a total weight, volume, and shape of the products to be shipped/delivered. Furthermore, various regulatory bodies, such as the FAA, may prohibit certain items (e.g., alcoholic beverages or magnetic items) from being delivered by a drone.

The system may either receive the criteria from a server associated with the merchant's online store (or a third party partner) retrieve the criteria from a data repository, such as a data table that includes an identifier for each delivery method and further includes the corresponding criteria. For example, the data table may include a listing of potential combinations of products, such as: one entrée, one side, one beverage; two entrees, one beverage; three sides, two beverages; and the like. By accessing the data table and indicating a particular item (e.g., the selected first item), the data table indicates which combinations including that particular item include additional products available for inclusion in the delivery. For example, when the customer selects two sides, then the potential combinations having two or more sides are still available, but the remaining combinations with less than two sides are no longer available options. As the customer selects additional items, the potential combinations are limited. If the final set of selected items matches a combination on the data table, the selected items may be delivered by that delivery method.

The analytics server may also identify the first item and its corresponding attributes (e.g., dimensions, weight, and type). The analytics server may apply and evaluate the criteria using the attributes associated with the first item to determine which other items (selected from the list of products offered by the merchant) are eligible. Upon retrieving the criteria, the analytics server may determine other products that can be included within the customer's electronic cart without violating the criteria. For instance, if the criteria limits the total delivery weight, the analytics server retrieves the weight of the first item and then calculates the remaining weight. Based on the remaining weight, the system then analyzes other products offered by the merchant's online store. As a result, the analytics server determines a list of products that do not comply with the retrieved criteria and cannot be included within the customer's electronic cart. The system can use this listing to determine which products can still be included for that delivery or to indicate which products would cause the delivery method to change due to non-compliance.

In another example, the retrieved criteria may limit the total volume for drone delivery. The analytics server may use a similar method as described above to determine which items violate the volume limit. In another example, the criteria may correspond to a list of prohibited items (e.g., alcoholic beverages). The analytics server may then determine the products offered by the merchant's online store that do not include alcohol and identify them as eligible items.

In some configurations, the analytics server (or another server associated with the merchant) may evaluate eligibility of a product and save the product's eligibility, e.g., as a tag associated with the product. Using this indexing and tagging system, the analytics server may identify eligible products using their corresponding tags. For instance, a product can be evaluated and all possible delivery methods can be stored as tags (e.g., automobile and bike). When the analytics server is determining whether the product can be delivered via a drone, the analytics server may query all tags associated with the product and determine that the product is not eligible because a drone tag is not associated with the product. Using this tagging and indexing system, the analytics server can identify compatibility and eligibility of products without evaluating the delivery criteria each time.

In addition to the methods described above, the analytics server may also use previous deliveries and the products delivered to different customers to determine eligible items. For instance, the analytics server may monitor all deliveries (e.g., delivery methods and products delivered) for all customers. For instance, if the merchant transmits a message back to the analytics server indicating that the merchant was able to successfully deliver one or more products via a particular delivery method, then the analytics server determines that future selections of those particular products for that particular delivery method is likely to be in compliance with the delivery criteria. The analytics server may generate one or more data tables that include an index of items and their corresponding delivery method and a corresponding value indicating whether the delivery was successfully performed before. Using this data table, the analytics server may determine whether a product is eligible.

The analytics server may also analyze whether the customers were satisfied with the deliveries previously performed. After a product has been delivered, the analytics server may prompt the customer to identify whether the customer was satisfied with the delivery conditions. Therefore, based on other customers' collective responses, the analytics server may determine a combination of products that caused dissatisfaction among customers. For instance, after identifying that 50% of customers were unhappy with drone delivery of raw eggs, the analytics server may designate raw eggs as an ineligible item.

In addition to the methods described above, the analytics server may also optimize the space used within the delivery apparatus (e.g., the delivery cart of a drone), when applicable. The analytics server may account for a size (e.g., shape or dimension) associated with different products. For instance, two products may have a similar volume and weight, such as a hockey stick and a bottle of water. However, one product may have a shape that may prohibit the product from being delivered via a desired delivery method. The analytics server may execute various modeling techniques to maximize the amount of the volume occupied by the products. The analytics server can analyze various attributes of the products (e.g., length, width, height, weight, preferred orientation, and fragility) to identify an optimum arrangement of the products. The analytics server may consider the volume of each product and the available (remaining) volume for the delivery.

The analytics server may analyze different orientation and placement of the products to determine which additional products can be added to the delivery apparatus. The analytics server may also evaluate and account for adding an additional buffer volume around each product to be delivered when performing the analysis. The "buffer" volume may account for the possibility that a drone packer employee's inefficiency in arranging various products having different shapes. As mentioned above, this method may only be applicable to certain delivery methods. For instance, this process may not be needed for automobile deliveries. However, the system may calculate the arrangement of products for drone deliveries.

In addition to the above-described methods, the analytics server may consider fragility when analyzing products and determining eligible items. The analytics server may determine not to combine fragile products with heavy products, as this combination may cause damage to the fragile product. In the event the attributes of a product received from the merchant's webserver does not include fragility, the analytics server may calculate fragility, for example, by estimating a weight-to-size product ratio. For example, a large, heavy product is not likely as fragile as a large, light product. In another example, most food products (e.g., food products other than canned food products) can be considered as fragile.

The delivery method may be selected by the user before or after selecting the first item. For instance, as described above, the user may have already selected a delivery method when accessing the GUI of the merchant's online store (entry point). In another embodiment, the user can select the delivery method after adding the first item to the electronic cart. Using the methods described herein, the analytics server may calculate what other products can be added to the customer's cart without violating the delivery criteria for the identified delivery method.

The analytics server may revise the delivery method based on whether the first item can be delivered using the delivery method. Therefore, the identified delivery method may be limited to a delivery method with which the first item can be delivered. In a non-limiting example, the customer's digital footprint may indicate that the user is interested in drone delivery. However, the analytics server may determine that the first item cannot be delivered via a drone. As a result, the analytics server identifies the delivery method as a different delivery method, even though the user's digital footprint indicates a drone delivery. In some configurations, the analytics server may transmit a notification informing the customer that the first item cannot be delivered via drones and may ask the customer to either select a different delivery method or change the first item to another product that can be delivered via drones.

At step 408, the analytics server may cause a dynamic revision to the GUI that displays one or more further items corresponding to the at least one further product, wherein the one or more further items are visually distinct from at least one item of the set of items.

The analytics server may dynamically revise the GUI (e.g., website or application associated with the merchant's online store), such that the remaining items that comply with the delivery criteria (eligible items) are visually distinct from other items offered by the merchant (ineligible items that correspond to products that cannot be delivered via the delivery method). As discussed above, the analytics server may determine eligible items that correspond to products that can be delivered without violating one or more criteria associated with the identified delivery method. As a result, the analytics server may revise the display of those products, such that the user can easily identify which item can be delivered without changing the delivery method.

Upon identifying the first item and delivery method (e.g., during a shopping process or during a checkout process), the customer may continue browsing the online site (e.g., by returning to a home page or product collection, or by being presented with additional offers on the customer's electronic cart). Based on eligibility of additional items, the analytics server may dynamically revise the GUI to either highlight the eligible items and/or present additional items to the customer.

In one example, the analytics server may filter the remaining items on the GUI, such that the customer is only presented the items that are eligible for the delivery method (e.g., the GUI no longer displays ineligible products). In another example, the analytics server may deactivate a graphical icon associated with ineligible items. For instance, the system may "grey out" ineligible items (e.g., deactivate the graphical element, such that the customer can no longer interact with the deactivated items) and therefore, prevent the customer from adding the ineligible items to the electronic cart. Additionally or alternatively, ineligible items may simply be shown with a grey overlay or opacity (e.g., less enticing/noticeable). However, the icons associated with the ineligible items may still be active (e.g., clickable or able to be interacted with). The analytics server may implement this method for customers who are willing to change their delivery method.

In another example, the analytics server may tag the eligible and/or ineligible items distinctly. For instance, the analytics server may display an indicator associated with eligible items, e.g., a small drone icon on eligible products for drone delivery or a green dot next to eligible items while ineligible items are displayed with a red dot.

In another example, the analytics server may rearrange the items displayed on the GUI, such that the eligible items are prioritized (e.g., on top of the list or page) while ineligible items are displayed less prominently elsewhere (e.g., bottom of the list or page). While rearranging the items and/or dynamically revising the GUI based on each item's eligibility, the analytics server can also highlight up-sell items and/or cross-sell items to the customer. For instance, the analytics server may execute various protocols to identify an up-sell item and may rearrange the icon for the up-sell item, such that it appears before other items. In another example, the system may display a notification/prompt presenting the up-sell and/or cross-sell items. For instance, the analytics server may display a notification that offers product adjustments for the customer (e.g., would you like to add an extra patty to your burger?) or suggest an additional item to be added the cart (e.g., would you like to add a side, drink, or dessert?).

In order to identify up-sell and/or cross-sell items, the analytics server may first analyze the item(s) added to the electronic cart (e.g., at least the first item). As described above, the analytics server may also retrieve various attributes (e.g., category, type, and/or content) of the first item. The analytics server may then retrieve one or more rules associated with identifying up-sell and/or cross-sell items. The rules may be specific to the merchant or the merchant's online store. For instance, the merchant may access a platform provided by the analytics server to input various criteria for up-sell and/or cross-sell of items. In a non-limiting example, a merchant may indicate that if a customer has purchased a food item, the analytics server should recommend a drink before the customer completes the transaction. In that example, the analytics server may identify that the customer has added a food item to the electronic cart. The analytics server may then determine then prioritize drinks by displaying them before other food items. The prioritized drinks may also be filtered based on the customer's identified delivery method. Therefore, the customer may only view drinks that are eligible to be delivered via the desired delivery method.

The analytics server may also display a toggle on the GUI with which the customer can interact to change the delivery method. The analytics server may display an input element configured to receive an input from the customer corresponding to a change in the delivery method. For instance, the customer can use the toggle input element to switch between drone delivery and automobile delivery. Using the toggle input element, the customer can change the delivery method without needing to leave the GUI that displays food items. When the analytics server receives an indication that the customer has interacted with the toggle input element, the analytics server may revise the GUI in accordance with the delivery criteria for the newly selected delivery method.

Figure 5:
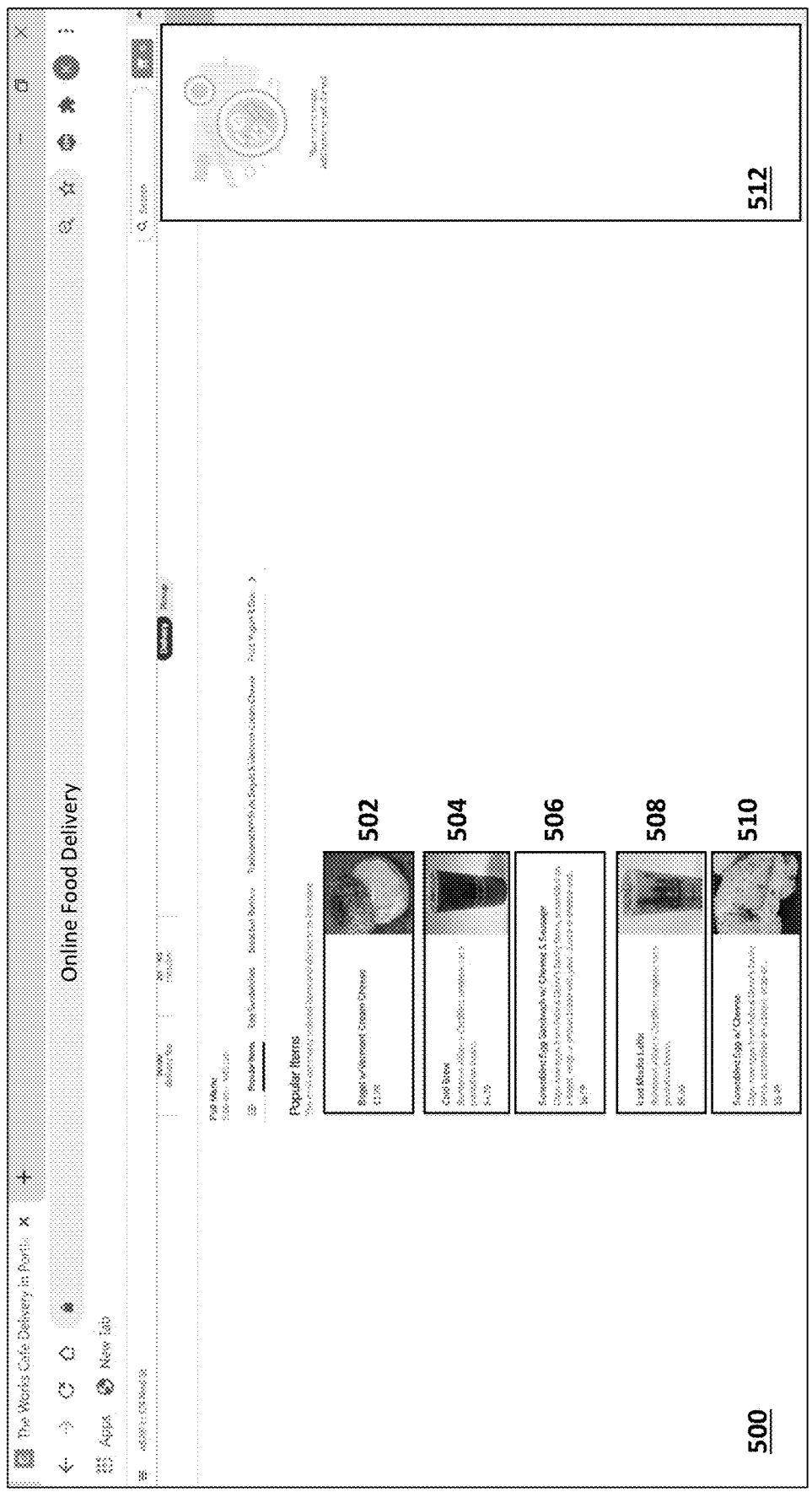
FIGS. 5-13 show examples of dynamic revisions of graphical user interfaces by a dynamic product presentation system, according to various embodiments.
Figure 6:
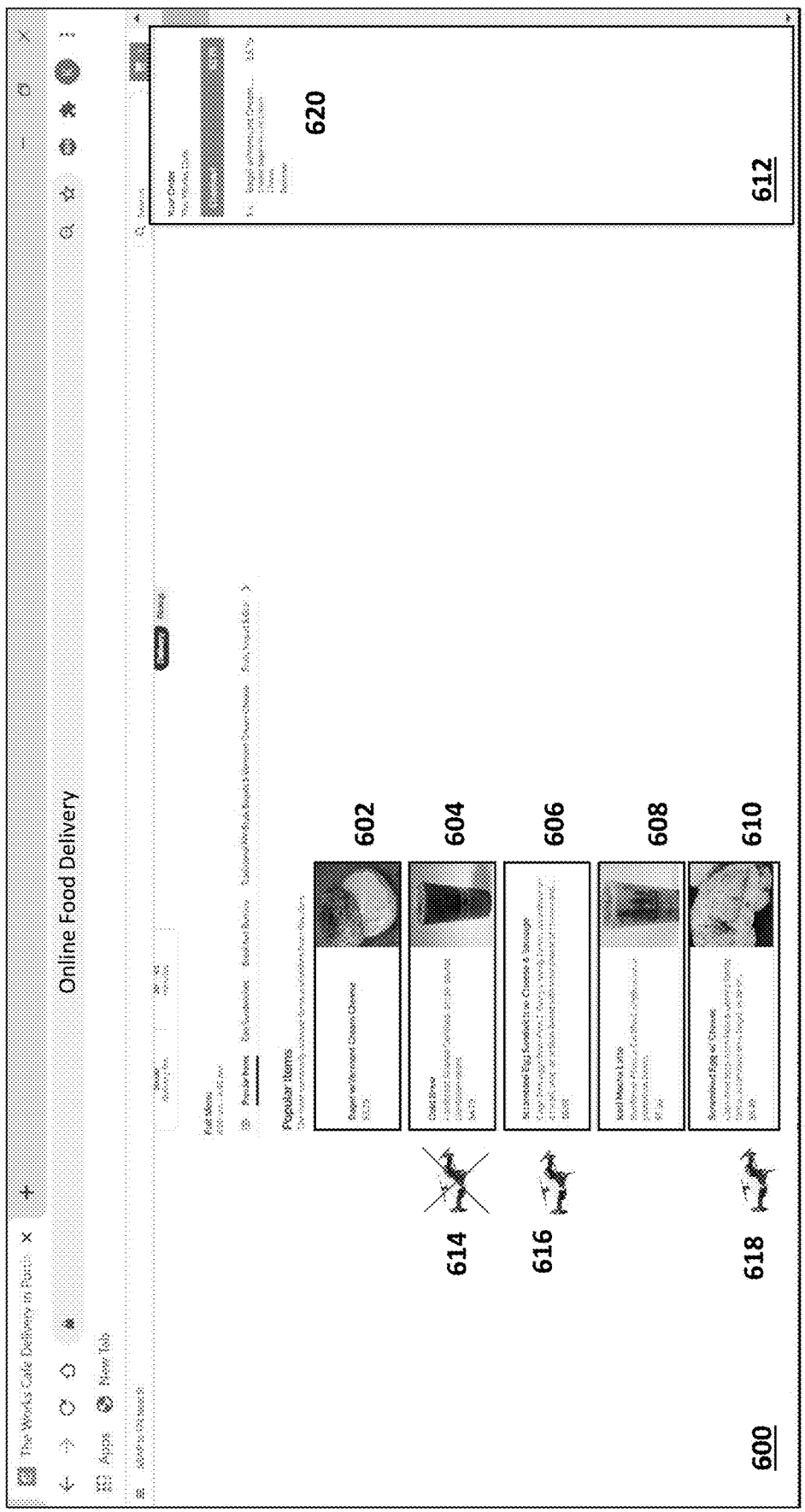
Figure 7:
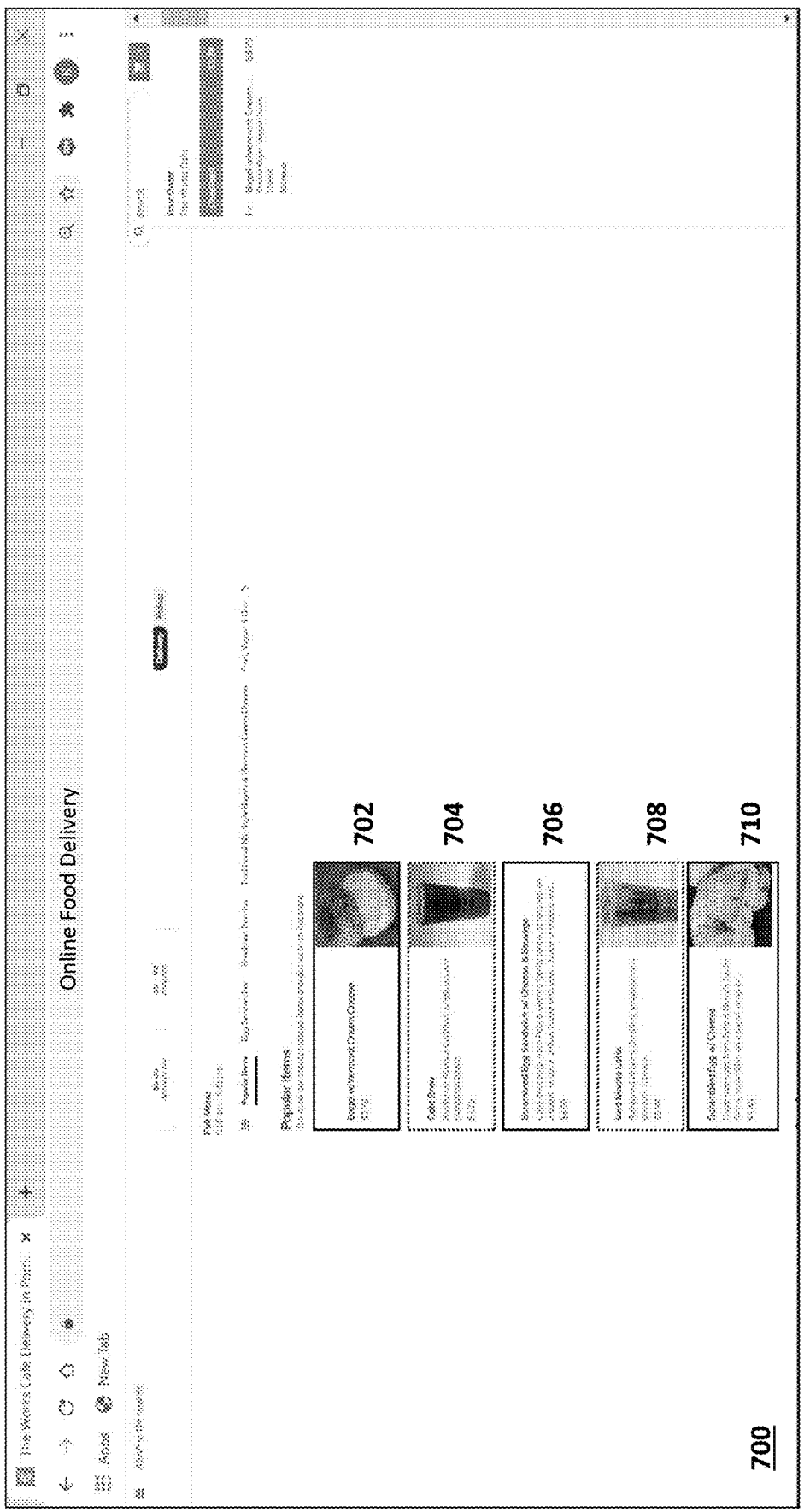
Figure 8:
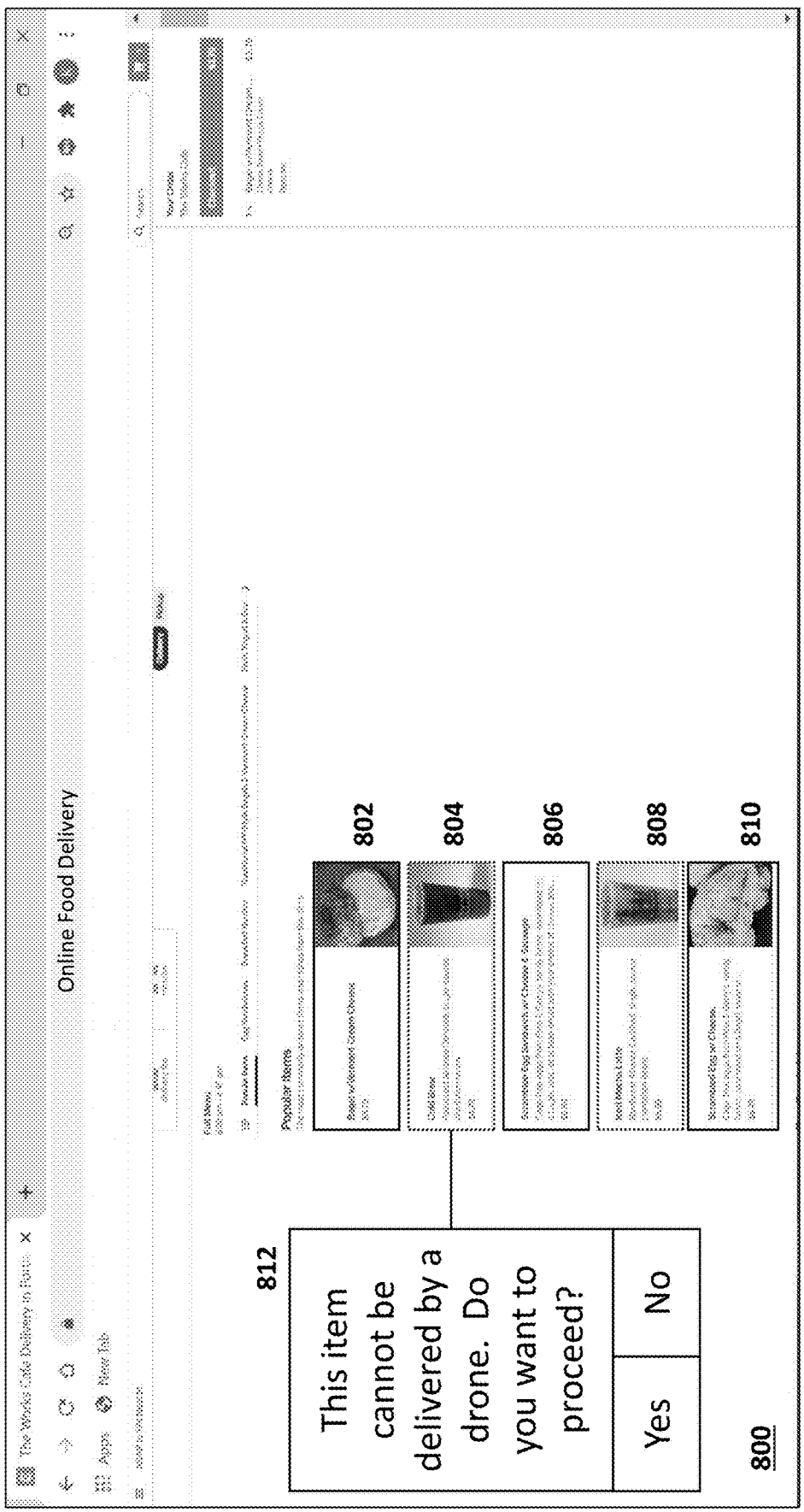
Figure 9:
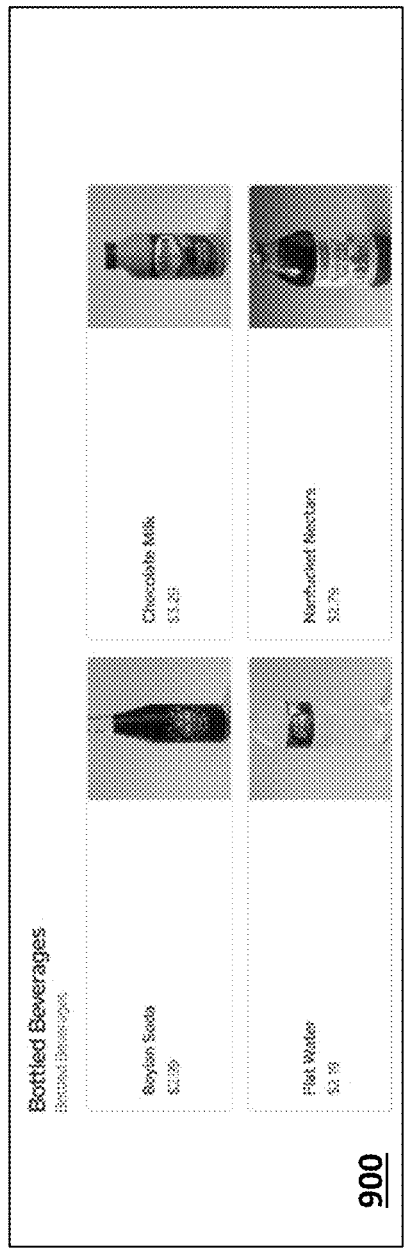

FIGS. 5-13 illustrate various non-limiting examples of the analytics server dynamically revising a presentation of one or more items. Referring now to FIG. 5, a customer may access the website 500. The website 500 may represent a merchant's online store where the customer can access to order food. FIGS. 5-13 are described in the context of a website rendering the merchant's online store. The methods and revisions described herein also apply to other visualization methods and modalities, such as merchant's online stores rendered on mobile applications.

When the customer accesses the website 500, the merchant's server may display the food items 502-510 based on various rules and regulations implemented by the merchant. For instance, the display of the food items 502-510 may be arranged based on a predetermined order, based on categories (e.g., food and drinks), or other display criteria. As depicted, the website 500 displays the food items 502-510 based on a popularity of the items (e.g., how frequently these items are purchased by other customers). The website 500 may also include a graphical component 512 where the website 500 displays items added to the electronic cart.

The customer may select one or more items to be added to the electronic cart. For example, the customer may add the food item 502 to the electronic cart. The customer may then be transitioned to the website 600, depicted in FIG. 6. The website 600 may display the icon 620 within the graphical component 612. The icon 620 indicates that the customer has added the food item 602 (corresponding to item 502) to the electronic cart.

The analytics server identifies the delivery method as drone delivery. The analytics server may retrieve the customer's digital footprint from a server associated with the merchant (e.g., webserver). After analyzing the customer's digital footprint, the analytics server may determine that the customer has clicked on a coupon banner that advertised drone delivery and provided a discount if the customer selected drone delivery. The analytics server then retrieves one or more criteria associated with drone delivery.

Using the methods and systems described herein, the analytics server analyzes the food items offered by the merchant's online store. As a result, the analytics server revises the food items displayed accordingly. Specifically, the analytics server may transmit a set of instructions to the webserver causing the display to be revised in accordance with the delivery method. In some embodiments, the analytics server may directly revise the display.

In one example, the analytics server displays the icons 614-618. These icons visually illustrate whether a product can be delivered by the identified delivery method. The icons may also visually correspond to the identified delivery method. In the depicted embodiment, the analytics server identifies the customer's desired delivery method as a drone delivery method. As a result, the icons 614-618 depict a drone. In another embodiment, the icons may depict a bicycle or an automobile. In the depicted embodiment, the icons 616 and 618 indicate that food item 606 and 610 can be delivered via a drone. In contrast, the icon 614 indicates that the food item 604 cannot be delivered via a drone delivery method.

The analytics server may display color icons instead. For instance, the analytics server may display a red icon or highlight when a product cannot be delivered via the identified delivery method and a green icon when the product can be delivered. Size, color, font, or any other visual aspect of the icons can be modified and/or customized by the customer and/or a system administrator. Additionally or alternatively, as depicted in the website 700 of FIG. 7, the analytics server may display food items 706 and 708 as de-activated (unclickable) and/or greyed out.

In some embodiments, the analytics server may provide the options for the customer to select a product, even though the product cannot be delivered via the identified and/or desired delivery method. For instance, when the customer interacts with the food item 704, the analytics server may transition to FIG. 8 where the analytics server displays the notification 812.

The notification 812 informs the customer that cold brew coffee in plastic cups with unsecure lid (food item 804 or item 704) cannot be delivered via a drone. The notification 812 also informs the customer that the customer can still proceed. If the customer desires to still add the food item 804 to the electronic cart, the analytics server may direct the customer to a new page where the new delivery method options (e.g., bicycle or automobile delivery) is available. As a result, the analytics server may revise the customer's delivery method.

The analytics server may display the graphical component 900 to provide more delivery options for the customer. For instance, when the customer clicks on "No" (notification 812), the analytics server displays various products (e.g., drinks) that can be selected instead of the food item 804. The analytics server may query a database to identify food items that comply with drone delivery criteria. For instance, the analytics server may query a database associated with the merchant's online store to identify items offered by the merchant that are similar to the food item 804 and do not violate drone delivery criteria. As a result, the analytics server identifies drinks that are securely packaged, as depicted in the graphical component 900.

Figure 10:
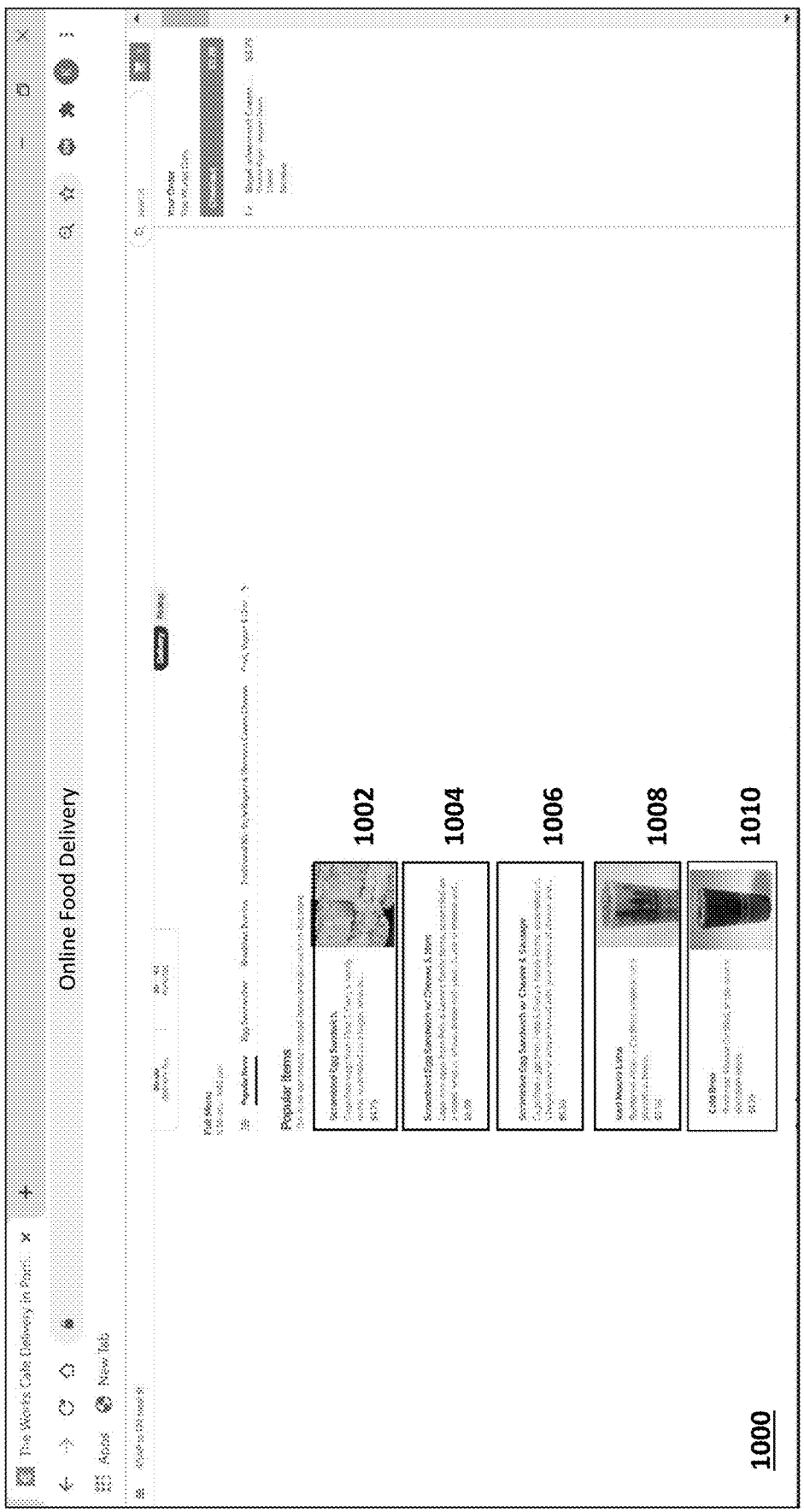

Additionally or alternatively, the analytics server may rank the food, such that eligible items are displayed before (or higher) than ineligible items. For instance, as depicted in FIG. 10, the website 1000 displays food items 1002-1006 (eligible items) above the food items 1008-1010 (ineligible items).

Figure 11:
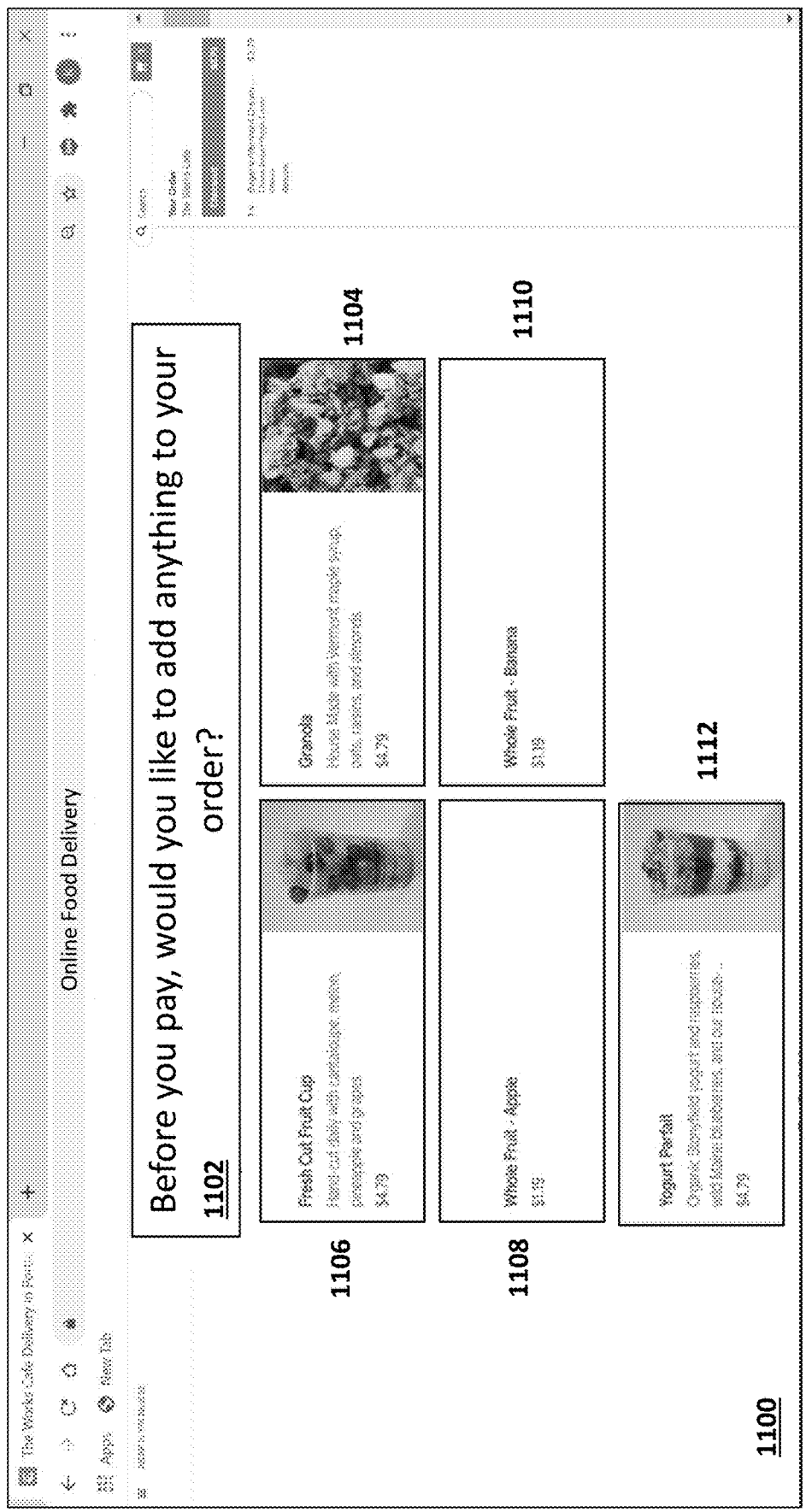

The analytics server may also recommend additional products before the customer completes the transaction. For instance, as depicted in FIG. 11 (website 1100), the analytics server may display the notification 1102 informing the customer of an option to add more items before checking out. The analytics server then identifies additional items (up-sell and/or cross-sell) to be displayed (e.g., food items 1106-1112).

Figure 12:
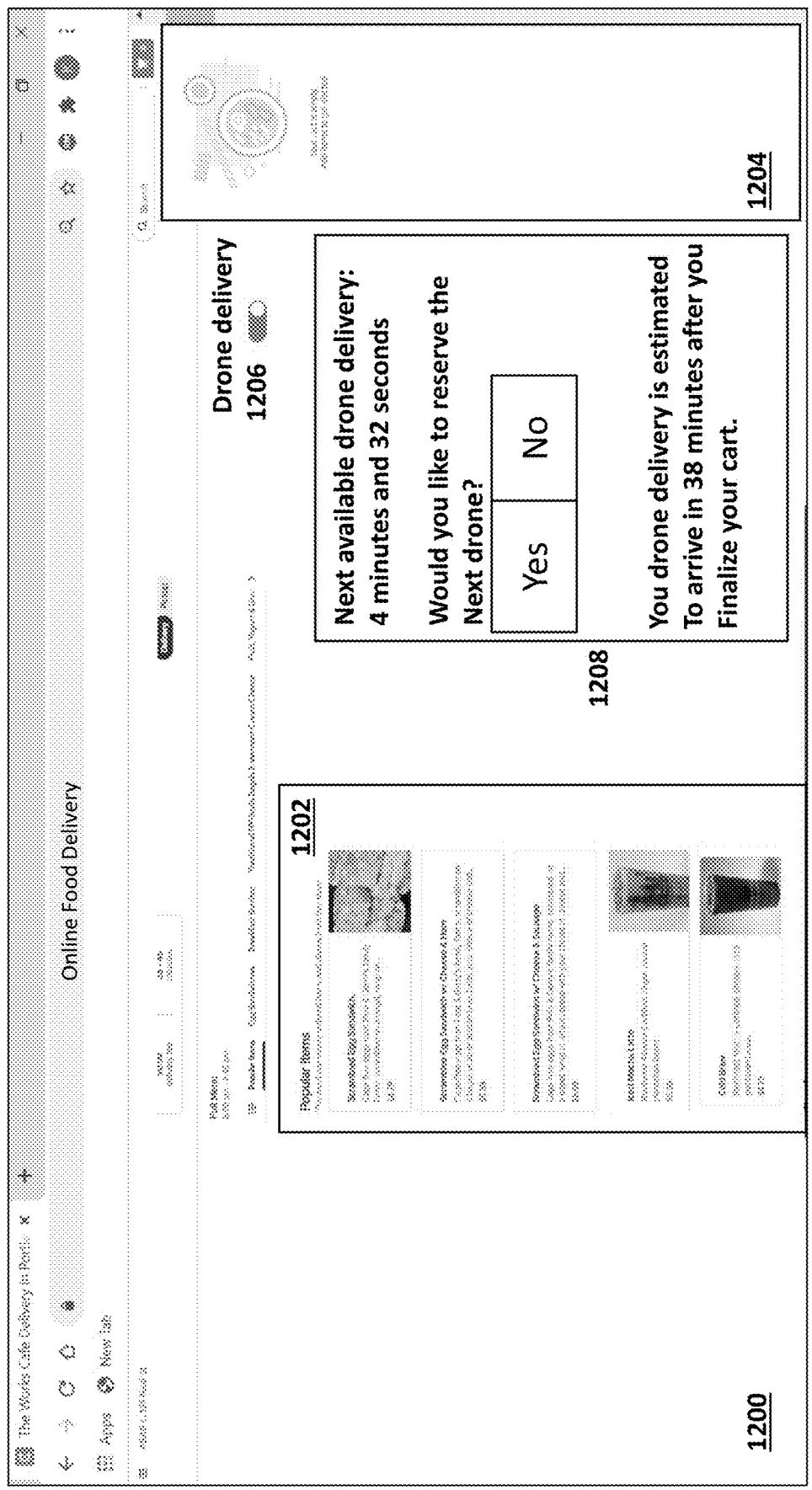
Figure 13:
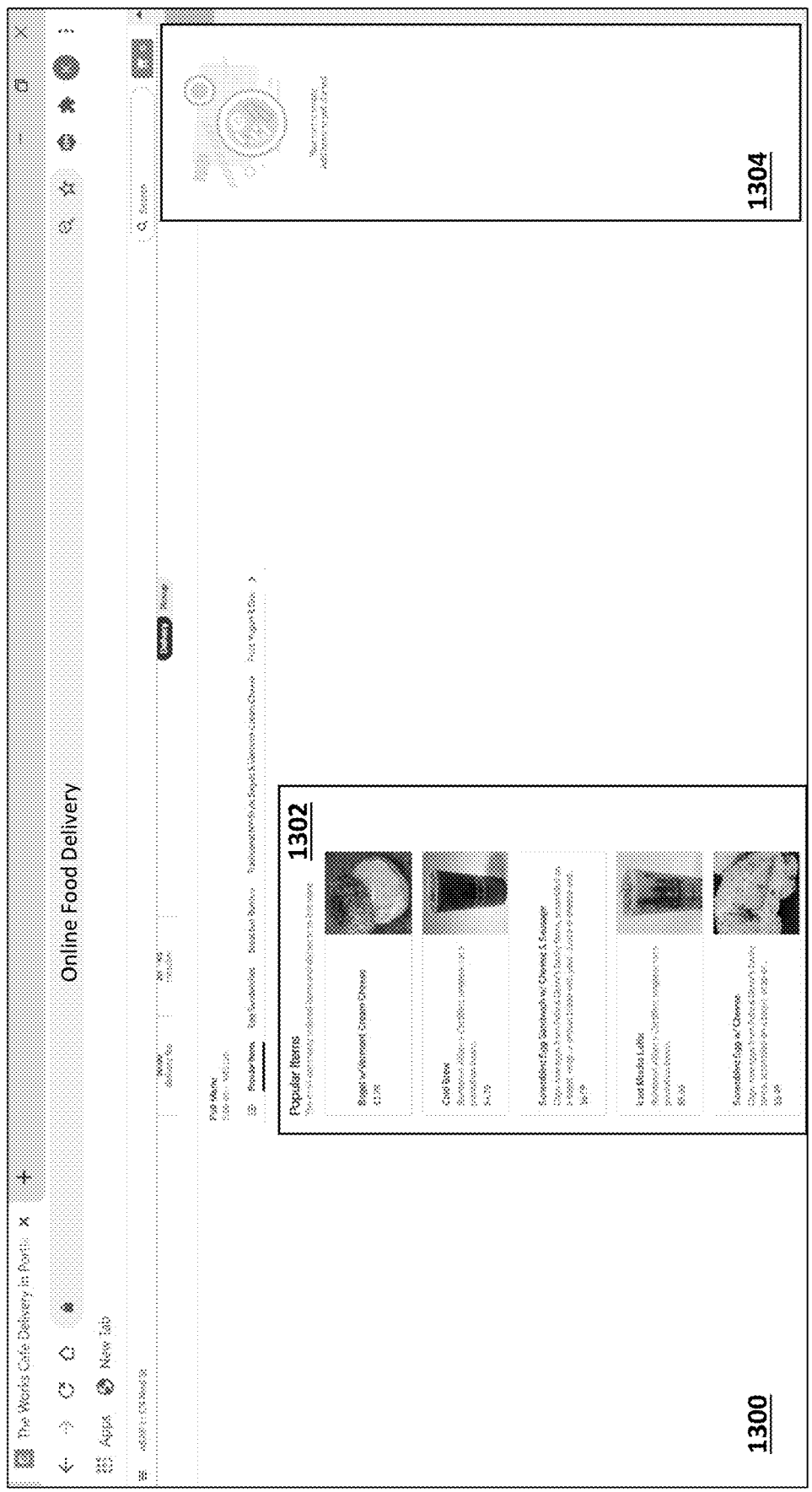

The methods described herein can be implemented at any time and regardless of whether the customer has selected an item to be added to the electronic cart. For instance, the analytics server may rearrange the food items, using the methods described herein, before the customer has added any food items to the electronic cart, as depicted in FIGS. 12-13. Websites 1200 and 1300 both represent the same merchant's online store. However, the analytics server has rearranged the food items displayed (graphical components 1202 and 1302) in accordance with delivery methods for the websites 1200 and 1300 respectively because the analytics server has determined that the website 1200 is visited by a customer who desires a different delivery method than the customer who has visited the website 1300. Also, as depicted in the graphical components 1204 and 1304, neither customer has added any items to the electronic cart. Therefore, the rearranging of the products can occur in real time as customers visit the merchant's online store's website.

In some embodiments, the analytics server may display a toggle 1206 that allows the user to change the delivery method. For instance, the user may interact with the toggle 1206 to turn the drone delivery off and switch to a default delivery method (e.g., automobile delivery). When the customer interacts with the toggle 1206, the analytics server may revise the food items displayed within the graphical component 1202 accordingly.

The website 1200 may also include the graphical component 1208 displaying a delivery status. For instance, the graphical component 1208 may display an indicator regarding when the next drone delivery is available and may include a countdown to when the next drone becomes available. The graphical component 1208 may also include an input element where the customer can reserve a drone while continuing/finalizing the electronic cart. In this way, the delivery is guaranteed to be performed via a drone while the customer is still shopping. In another example, the graphical component 1208 may include an estimated delivery time.

Non-Limiting Example

A customer is browsing a restaurant's online site and selects two orders of Pad Thai to add to an electronic cart. The customer indicates interest in drone delivery as the shipping method using a dropdown menu in the cart or using an input element in the navigation bar. The customer then scrolls down to the "drinks" section to view available beverages.

The system may automatically calculate which drinks are eligible to be added to the cart. For instance, based on the weight and size of the two orders of Pad Thai, the large cans of craft beer (473 ml craft beer) are now too heavy for the order to continue to qualify for drone delivery. However, the system determines that 355 ml cans of drinks are still eligible. The system also determines that custom drinks made by the restaurant that are poured into Styrofoam cups are also ineligible because the drone delivery criteria specifically prohibits delivery of liquid that is not secured (e.g., drinks that are not placed in cans).

As a result, when the customer accesses the drinks section, the 473 ml craft beer products and all drinks that are offered in Styrofoam cups are greyed out (e.g., deactivated and un-clickable). In contrast, all canned drinks (355 ml soft drinks) are presented on the website and have a drone delivery icon present near the product image. The customer adds one can of pop to the cart and proceeds to the checkout page.

On the checkout page, the system presents a cross-sell notification for the customer. The cross-sell notification is a pop-up window presented to the customer that displays two appetizer products and one dessert product, which are randomly chosen from the available (and eligible) options and presented to the customer for possible addition to the order, but will still satisfy the delivery criteria for the requested drone delivery. The system may automatically filter the pool of available options for the cross-sell based on the product already selected by the customer and the delivery method.

In an embodiment, a method comprises receiving, by a processor, an indication of a selection of a first item from a set of items displayed on a graphical user interface, the set of items corresponding to at least some products of a plurality of products; identifying, by the processor, a delivery method, wherein the first item is deliverable using the delivery method; determining, by the processor, at least one further product of the plurality of products that satisfies at least one delivery criteria for the delivery method; and causing, by the processor, a dynamic revision to the graphical user interface that displays at least one further item corresponding to the at least one further product, wherein the at least one further item is visually distinct from at least one item of the set of items.

Causing the dynamic revision to the graphical user interface may comprise relocating at least one item corresponding to the at least one further product on the graphical user interface.

Determining at least one further product of the plurality of products may comprise identifying, by the processor, at least one product from combinations of products that includes a first product corresponding to the first item and satisfies the at least one delivery criteria for the delivery method.

The at least one delivery criteria may comprise at least one of a weight limit for the delivery method, a volume limit for the delivery method, or a size limit for the delivery method.

The processor may identify the delivery method based on an entry point by a user to the graphical user interface.

The delivery method may be an aerial delivery method using a drone from a plurality of drones, and wherein the processor determines the delivery method via an availability status of each drone within the plurality of drones or an estimated flight time of each drone within the plurality of drones.

The processor may cause the dynamic revision to the graphical user interface such that the graphical user interface only displays at least one further item corresponding to the at least one further product.

The processor may further adjust the at least one delivery criteria for the delivery method based on a status of at least one previous delivery and at least one product from the plurality of products in the at least one previous delivery.

At least one item of the set of items may be visually distinct by displaying a visual indicator corresponding to a delivery status of the at least one further item corresponding to the at least one further product.

In another embodiment, a machine-readable storage medium having computer-executable instructions stored thereon that, when executed by one or more processors, cause the one or more processors to perform operations comprises receiving an indication of a selection of a first item from a set of items displayed on a graphical user interface, the set of items corresponding to at least some products of a plurality of products; identifying a delivery method, wherein the first item is deliverable using the delivery method; determining at least one further product of the plurality of products that satisfies at least one delivery criteria for the delivery method; and causing a dynamic revision to the graphical user interface that displays at least one further item corresponding to the at least one further product, wherein the at least one further item is visually distinct from at least one item of the set of items.

Causing the dynamic revision to the graphical user interface may comprise relocating at least one item corresponding to the at least one further product on the graphical user interface.

Determining at least one further product of the plurality of products may comprise identifying at least one product from combinations of products that includes a first product corresponding to the first item and satisfies the at least one delivery criteria for the delivery method.

The at least one delivery criteria may comprise at least one of a weight limit for the delivery method, a volume limit for the delivery method, or a size limit for the delivery method.

The instructions may further cause the processor to identify the delivery method based on an entry point by a user to the graphical user interface.

The delivery method may be an aerial delivery method using a drone from a plurality of drones, and wherein the instructions cause the processor to determine the delivery method via an availability status of each drone within the plurality of drones or an estimated flight time of each drone within the plurality of drones.

The processor may further cause the dynamic revision to the graphical user interface such that the graphical user interface only displays at least one further item corresponding to the at least one further product.

The instructions may further cause the processor to adjust the at least one delivery criteria for the delivery method based on a status of at least one previous delivery and at least one product from the plurality of products in the at least one previous delivery.

At least one item of the set of items may be visually distinct by displaying a visual indicator corresponding to a delivery status of the at least one further item corresponding to the at least one further product.

In another embodiment, a server having a processor, the server in communication with a computing device associated with a graphical user interface, the server configured to: receive an indication of a selection of a first item from a set of items displayed on the graphical user interface, the set of items corresponding to at least some products of a plurality of products; identify a delivery method, wherein the first item is deliverable using the delivery method; determine at least one further product of the plurality of products that satisfies at least one delivery criteria for the delivery method; and cause a dynamic revision to the graphical user interface that displays at least one further item corresponding to the at least one further product, wherein the at least one further item is visually distinct from at least one item of the set of items.

Causing the dynamic revision to the graphical user interface may comprise relocating at least one item corresponding to the at least one further product on the graphical user interface.

The foregoing method descriptions and the process flow diagrams are provided merely as illustrative examples and are not intended to require or imply that the operations of the various embodiments must be performed in the order presented. The operations in the foregoing embodiments may be performed in any order. Words such as "then," "next," etc. are not intended to limit the order of the operations; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The operations of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
   receiving, by a processor, an indication of a selection of a first item from a set of items displayed on a graphical user interface, the set of items corresponding to a set of products;
   identifying, by the processor, a delivery method, wherein the first item is deliverable using the delivery method;
   determining, by the processor, at least one further product of the set of products that satisfies at least one delivery criteria for the delivery method, the at least one further product corresponding to at least one item of the set of items displayed on the graphical user interface; and
   revising, by the processor, the graphical user interface by visually distinguishing at least one further item of the set of items displayed on the graphical user interface based on the selection of the first item and the delivery criteria, the at least one further item corresponding to the at least one further product, wherein the at least one further item, that is eligible with respect to the delivery method, is visually distinguished from at least one other item of the set of items displayed on the graphical user interface that is not eligible with respect to the delivery method by a graphical indicator of eligibility with respect to the delivery method.

2. The method of claim 1, wherein visually distinguishing the at least one further item further comprises relocating the at least one further item on the graphical user interface.

3. The method of claim 1, wherein determining at least one further product of the plurality of products comprises identifying, by the processor, at least one product from at least one combination of products that includes a first product corresponding to the first item and satisfies the at least one delivery criteria for the delivery method.

4. The method of claim 1, wherein the at least one delivery criteria comprises at least one of a weight limit for the delivery method, a volume limit for the delivery method, or a size limit for the delivery method.

5. The method of claim 1, wherein the processor identifies the delivery method based on an entry point by a user to the graphical user interface.

6. The method of claim 1, wherein the delivery method is an aerial delivery method using a drone from a plurality of drones, and wherein the processor determines the delivery method via an availability status of each drone within the plurality of drones or an estimated flight time of each drone within the plurality of drones.

7. The method of claim 1, wherein visually distinguishing the at least one further item comprises removing a second item displayed on the graphical user interface.

8. The method of claim 1, further comprising adjusting, by the processor, the at least one delivery criteria for the delivery method based on a status of at least one previous delivery and at least one product from the plurality of products in the at least one previous delivery.

9. The method of claim 1, wherein visually distinguished from at least one item of the set of items comprises visually distinguishing the at least one item by displaying, by the processor, a visual indicator corresponding to a delivery status of the at least one further item corresponding to the at least one further product.

10. A non-transitory machine-readable storage medium having computer-executable instructions stored thereon that, when executed by one or more processors, cause the one or more processors to perform operations comprising:
    receiving an indication of a selection of a first item from a set of items displayed on a graphical user interface, the set of items corresponding to a plurality of products;
    identifying a delivery method, wherein the first item is deliverable using the delivery method;
    determining at least one further product of the plurality of products that satisfies at least one delivery criteria for the delivery method, the at least one further product corresponding to at least one item of the set of items displayed on the graphical user interface; and
    revising the graphical user interface by visually distinguishing at least one further item of the set of items displayed on the graphical user interface based on the selection of the first item and the delivery criteria, the at least one further item corresponding to the at least one further product, wherein the at least one further, that is eligible with respect to the delivery method, item is visually distinguished from at least one other item of the set of items displayed on the graphical user interface that is not eligible with respect to the delivery method by a graphical indicator of eligibility with respect to the delivery method.

11. The machine-readable storage medium of claim 10, wherein visually distinguishing the at least one further item further comprises relocating the at least one further item on the graphical user interface.

12. The machine-readable storage medium of claim 10, wherein determining at least one further product of the plurality of products comprises identifying at least one product from at least one combination of products that includes a first product corresponding to the first item and satisfies the at least one delivery criteria for the delivery method.

13. The machine-readable storage medium of claim 10, wherein the at least one delivery criteria comprises at least one of a weight limit for the delivery method, a volume limit for the delivery method, or a size limit for the delivery method.

14. The machine-readable storage medium of claim 10, wherein the instructions further cause the one or more processors to identify the delivery method based on an entry point by a user to the graphical user interface.

15. The machine-readable storage medium of claim 10, wherein the delivery method is an aerial delivery method using a drone from a plurality of drones, and wherein the instructions cause the processor to determine the delivery method via an availability status of each drone within the plurality of drones or an estimated flight time of each drone within the plurality of drones.

16. The machine-readable storage medium of claim 10, wherein visually distinguishing the at least one further item comprises removing a second item displayed on the graphical user interface.

17. The machine-readable storage medium of claim 10, wherein the instructions further cause the one or more processors to adjust the at least one delivery criteria for the delivery method based on a status of at least one previous delivery and at least one product from the plurality of products in the at least one previous delivery.

18. The machine-readable storage medium of claim 10, wherein visually distinguished from at least one item of the set of items comprises visually distinguishing the at least one item by displaying a visual indicator corresponding to a delivery status of the at least one further item corresponding to the at least one further product.

19. A computer system comprising:
a server having a processor, the server in communication with a computing device associated with a graphical user interface, the server configured to:
receive an indication of a selection of a first item from a set of items displayed on the graphical user interface, the set of items corresponding a set of products;
identify a delivery method, wherein the first item is deliverable using the delivery method;
determine at least one further product of the set of products that satisfies at least one delivery criteria for the delivery method, the at least one further product corresponding to at least one item of the set of items displayed on the graphical user interface; and
revise the graphical user interface by visually distinguish at least one further item of the set of items displayed on the graphical user interface based on the selection of the first item and the delivery criteria, the at least one further item corresponding to the at least one further product, wherein the at least one further item, that is eligible with respect to the delivery method, is visually distinguished from at least one other item of the set of items displayed on the graphical user interface that is not eligible with respect to the delivery method by a graphical indicator of eligibility with respect to the delivery method.

20. The computer system of claim 19, wherein visually distinguishing the at least one further item further comprises relocating the at least further one item on the graphical user interface.

* * * * *